United States Patent
Chung et al.

(10) Patent No.: US 10,110,818 B2
(45) Date of Patent: Oct. 23, 2018

(54) PHOTOGRAPHING APPARATUS MODULE WITH IMAGE STABILIZATION, USER TERMINAL INCLUDING PHOTOGRAPHING APPARATUS

(71) Applicant: SAMSUNG ELECTRONICS CO., LTD., Suwon-si, Gyeonggi-do (KR)

(72) Inventors: Hae-in Chung, Anyang-si (KR); Jin-won Lee, Seongnam-si (KR); Chong-sam Chung, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 47 days.

(21) Appl. No.: 15/173,885

(22) Filed: Jun. 6, 2016

(65) Prior Publication Data
US 2017/0150055 A1    May 25, 2017

(30) Foreign Application Priority Data
Nov. 24, 2015 (KR) .................. 10-2015-0164839

(51) Int. Cl.
H04N 5/228    (2006.01)
H04N 5/232    (2006.01)
H04N 5/225    (2006.01)

(52) U.S. Cl.
CPC ....... *H04N 5/23287* (2013.01); *H04N 5/2253* (2013.01); *H04N 5/2254* (2013.01); *H04N 5/2257* (2013.01); *H04N 5/23258* (2013.01)

(58) Field of Classification Search
CPC .................................................. H04N 5/23287
See application file for complete search history.

(56) References Cited

U.S. PATENT DOCUMENTS

| | | | |
|---|---|---|---|
| 7,345,833 B2 | 3/2008 | Hwang | |
| 7,812,507 B2 | 10/2010 | Takahashi et al. | |
| 9,013,588 B2 | 4/2015 | Moriya et al. | |
| 2010/0239237 A1* | 9/2010 | Lee | G03B 17/00 396/55 |
| 2014/0009631 A1 | 1/2014 | Topliss | |
| 2014/0301728 A1 | 10/2014 | Guenter et al. | |
| 2015/0201127 A1* | 7/2015 | Ahn | G03B 5/02 348/208.99 |

FOREIGN PATENT DOCUMENTS

| | | |
|---|---|---|
| JP | 2009-044856 | 2/2009 |
| JP | 2011-065140 | 3/2011 |

* cited by examiner

*Primary Examiner* — Gary C Vieaux
(74) *Attorney, Agent, or Firm* — Nixon & Vanderhye, P.C.

(57) ABSTRACT

A photographing apparatus module is disclosed, and includes: an image sensor module; a lens module shifted with respect to the image sensor module in a first direction or a second direction that is perpendicular to an optical axis direction of incident light; and an image stabilization module arranged in the image sensor module and applying a driving force to the lens module.

17 Claims, 17 Drawing Sheets

PHOTOGRAPHING APPARATUS MODULE WITH IMAGE STABILIZATION, USER TERMINAL INCLUDING PHOTOGRAPHING APPARATUS

CROSS-REFERENCE TO RELATED APPLICATION

This application is based on and claims priority under 35 U.S.C. § 119 to Korean Patent Application No. 10-2015-0164839, filed on Nov. 24, 2015, in the Korean Intellectual Property Office, the disclosure of which is incorporated by reference herein in its entirety.

BACKGROUND

1. Field

The present disclosure relates to a photographing apparatus module for photographing an image, and a user terminal device including the same.

2. Description of Related Art

As manufacturing techniques of digital cameras have been developed, electronic devices, for example, mobile terminals, which are equipped with a light and miniaturized photographing apparatus module, have already been commercialized. As the photographing apparatus module is provided in the portable mobile terminals, users may take pictures and photograph videos, and may conveniently use various functions, such as a video call, authenticated reality, etc.

As electronic devices generally include the photographing apparatus module, there have been continual attempts to improve the performance of the photographing apparatus module, for example, image quality, etc. as well as to miniaturize the photographing apparatus module. As one of the techniques for improving the performance of a camera lens assembly, there is, for example, an image stabilization technique. The image stabilization technique is a technique for compensating a tremble on a subject, due to vibration of a human body, such as a hand tremble of a user, etc. The image stabilization may be performed by detecting vibration applied to a device via a plurality of sensors, etc. provided in the photographing apparatus module, and shifting a lens or an image sensor according to a speed or direction of the detected vibration.

SUMMARY

A photographing apparatus module including an image stabilization function, and a user terminal device including the photographing apparatus module are provided.

Additional aspects will be set forth in part in the description which follows and, in part, will be apparent from the description.

According to an aspect of an example embodiment, a photographing apparatus module includes: an image sensor module comprising an image sensor; a lens module including a lens, wherein the lens module is shifted with respect to the image sensor module in a first direction or a second direction that is perpendicular to an optical axis direction of incident light; and an image stabilization module including image stabilization circuitry arranged in the image sensor module configured to apply a driving force to the lens module.

The image sensor module may include a sensor circuit substrate facing the lens module and an image sensor on a surface of the sensor circuit substrate, and the image stabilization module may include a first image stabilization driving unit on a surface of the sensor circuit substrate facing the lens module, the first image stabilization driving unit being configured to apply a driving force to the lens module in the first direction, and a second image stabilization driving unit on a surface of the sensor circuit substrate facing the lens module, the second image stabilization driving unit being configured to apply a driving force to the lens module in the second direction.

The sensor circuit substrate may include a rigid substrate.

The first image stabilization driving unit may include a plurality of first piezoelectric devices which are spaced apart from one another in the first direction, and the second image stabilization driving unit may include a plurality of second piezoelectric devices which are spaced apart from one another in the second direction.

The plurality of first piezoelectric devices and the plurality of second piezoelectric devices may be disposed around the image sensor.

The lens module may include a contact unit facing the plurality of first piezoelectric devices and the plurality of second piezoelectric devices.

The photographing apparatus module may further include a first case configured to accommodate the lens module, and a second case configured to accommodate the first case. The lens module may be shifted with respect to the first case in the first direction, and the first case may be shifted with respect to the second case in the second direction.

The photographing apparatus module may further include a first-first sensor configured to detect a displacement of a shift of the photographing apparatus module in the first direction, and a first-second sensor configured to detect a displacement of a shift of the photographing apparatus module in the second direction.

The photographing apparatus module may further include a second-first sensor configured to detect a displacement of the shift of the lens module in the first direction, a second-second sensor configured to detect a displacement of the shift of the lens module in the second direction, and a controller configured to compare the displacements of the shifts of the photographing apparatus module, which are received from the first-first sensor and the first-second sensor, with the displacements of the shifts of the lens module, which are received from the second-first sensor and the second-second sensor, and to apply a driving signal to the first image stabilization driving unit and the second image stabilization driving unit.

The image sensor module may include a sensor circuit substrate facing the lens module and an image sensor on a surface of the sensor circuit substrate. The image stabilization module may include a first image stabilization driving unit on a second surface of the sensor circuit substrate, which faces a first surface of the sensor circuit substrate facing the lens module, the first image stabilization driving unit being configured to apply a driving force to the lens module in the first direction, and a second image stabilization driving unit on the second surface of the sensor circuit substrate, the second image stabilization driving unit being configured to apply a driving force to the lens module in the second direction.

The photographing apparatus module may further include a first case configured to accommodate the lens module, and a second case configured to accommodate the first case. The lens module may be shifted with respect to the first case in the first direction, and the first case unit may be shifted with respect to the second case in the second direction.

The sensor circuit substrate may include a flexible substrate.

The photographing apparatus module may further include a support substrate facing the second surface of the sensor circuit substrate. The first image stabilization driving unit may include a plurality of first piezoelectric devices which are spaced apart from one another in the first direction, and the second image stabilization driving unit may include a plurality of second piezoelectric devices which are spaced apart from one another in the second direction.

The plurality of first and second piezoelectric devices may be arranged on the second surface of the sensor circuit substrate in a substantially lattice shape.

The lens module may include a contact unit facing the first surface of the sensor circuit substrate.

The photographing apparatus module may further include a first case configured to accommodate the lens module. The lens module may be tilted with respect to the first case, based on the first direction, and may be tilted with respect to the first case, based on the second direction.

A rear surface portion of the lens module may have a semi-spherical shape, and the sensor circuit substrate may include a flexible substrate and have a semi-spherical shape corresponding to the shape of the rear surface portion of the lens module.

The photographing apparatus module may further include a support unit facing the second surface of the sensor circuit substrate. The first image stabilization driving unit and the second image stabilization unit may include a plurality of piezoelectric devices which are arranged on the second surface of the sensor circuit substrate as a lattice shape.

The lens module may include a contact unit facing the first surface of the sensor circuit substrate.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
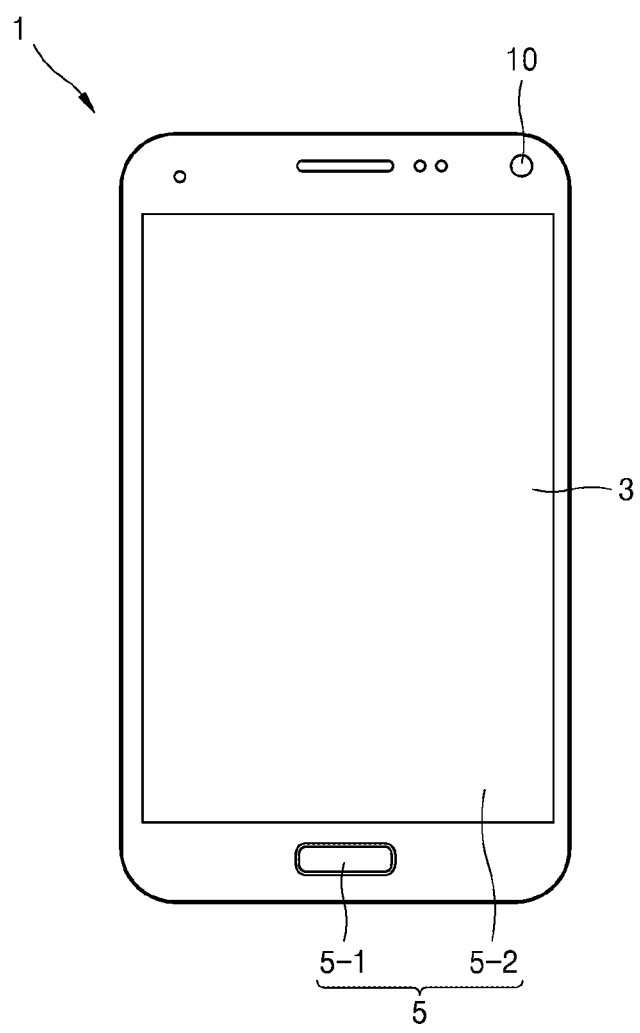
FIG. 1 is a front view of a user terminal device.

The example embodiments will now be described more fully with reference to the accompanying drawings, in which example embodiments of the disclosure are shown. It should be understood, however, that there is no intent to limit example embodiments to the particular forms disclosed, but conversely, example embodiments are intended to cover all modifications, equivalents, and alternatives falling within the spirit and scope of the disclosure. Like reference numerals denote like elements in the drawings.

In the attached drawings, sizes of structures may be exaggerated for clarity. As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an" and "the" are intended to include the plural forms as well, unless the context clearly indicates otherwise.

Also, the terms such as " . . . unit," "module," or the like used in the present application indicate an unit, which processes at least one function or motion, and the unit may be implemented by hardware, firmware or software, or by a combination of hardware and software.

FIG. 1 is a front view of a user terminal device 1.

The user terminal device 1 in this description may be a wearable device, such as a cellular phone, a tablet personal computer (PC), a PC, a smart television (TV), a personal digital assistant (PDA), a laptop computer, a media player, an MP3 player, a micro server, a GPS device, an electronic book terminal, a terminal for digital broadcasting, a kiosk, an electronic frame, a navigation, a digital TV, a wrist watch, a head-mount display (HMD), etc., or other mobile or non-mobile computing devices. However, the disclosure concept is not limited thereto.

Referring to FIG. 1, the user terminal device 1 may include a display unit 3, an input/output module 5, and a photographing apparatus module 10.

The display unit 3 may include a display panel and a controller (not shown) for controlling the display panel. The display panel may be realized as various types of displays, such as a liquid crystal display (LCD), an organic light-emitting diode (OLED) display, an active-matrix organic light-emitting diode (AM-OLED) display, a plasma display panel (PDP), etc.

The input/output module 5 is a transmission device configured to receive an input signal input from the outside and transmit an output signal to the outside. The input/output module 5 may include at least one of at least one button 5-1 and a touch panel 5-2.

The photographing apparatus module 10 is a photographing member configured to photograph a still image or a video. For example, the photographing apparatus module 10 may be provided in a multiple number, wherein one photographing apparatus module 10 may be arranged at a front surface of the user terminal device 1 and other photographing apparatus modules (not shown) may be arranged at a rear surface of the user terminal device 1. Also, the plurality of photographing apparatus modules 10 may be arranged adjacent to one another (for example, with a gap between each other that is greater than 1 cm and less than 8 cm) and may photograph a three-dimensional still image or a three-dimensional video. Also, the photographing apparatus module 10 may include an auxiliary light source (not shown) providing an amount of light necessary for photographing. Detailed aspects with respect to the structure of the photographing apparatus module 10 will be described later with reference to FIGS. 2 through 4.

Figure 2:
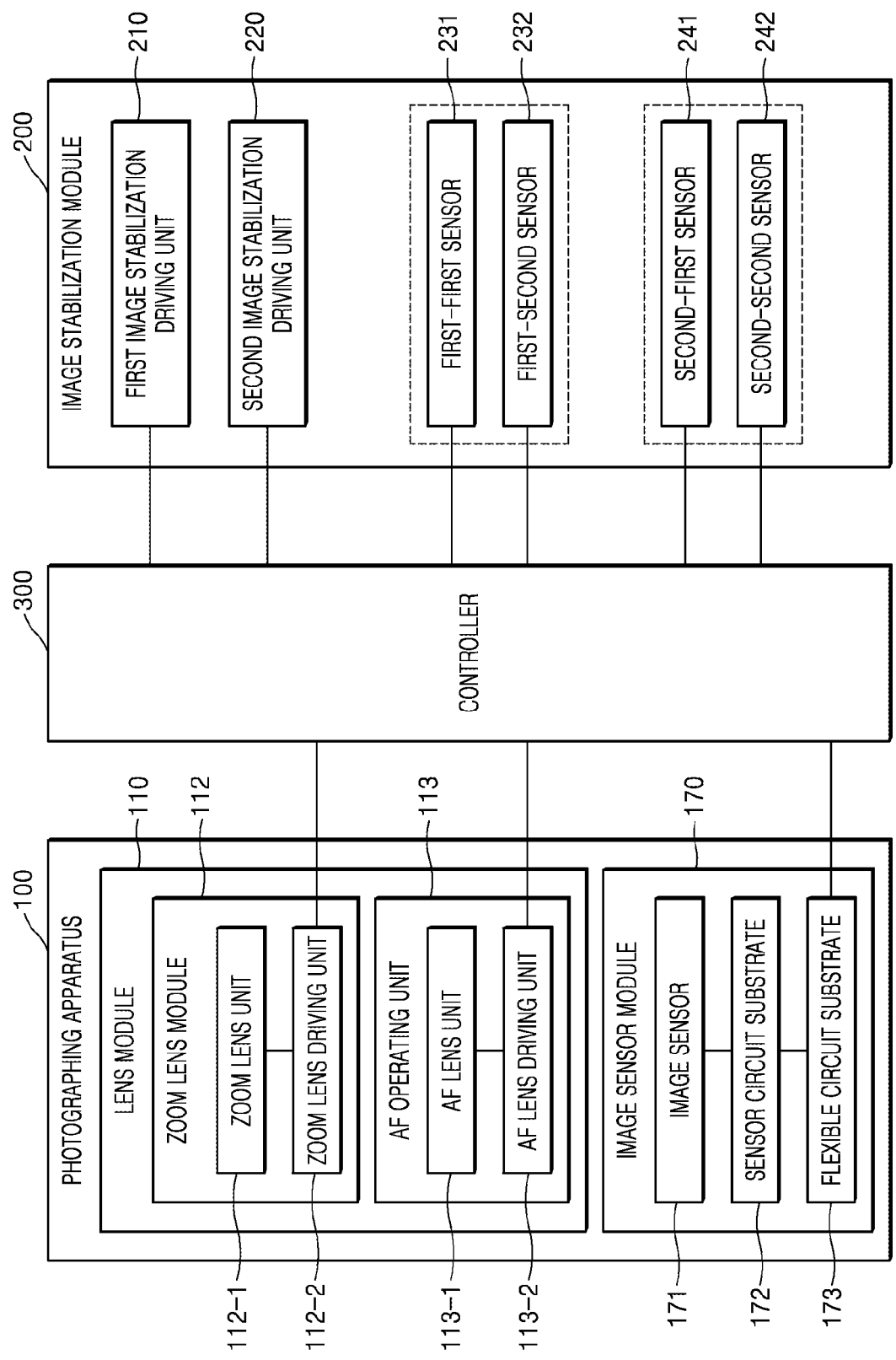
FIG. 2 is a block diagram of a structure of a photographing apparatus module.
Figure 3:
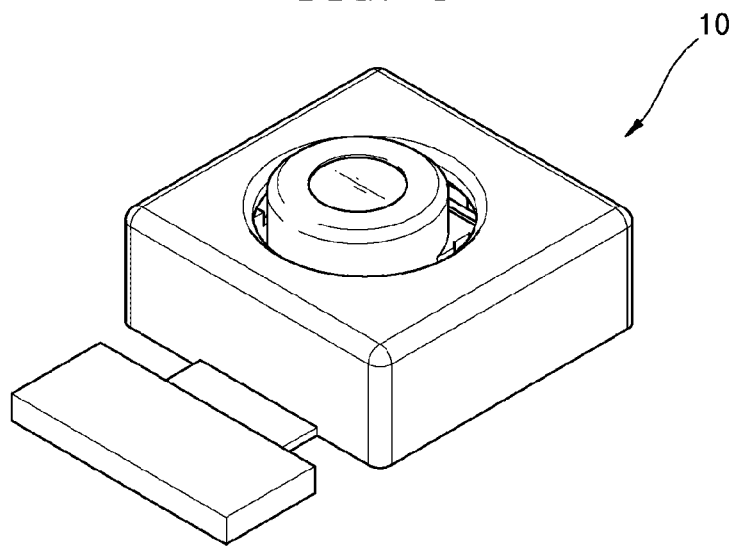
FIG. 3 is a perspective view of a photographing apparatus module.
Figure 4:
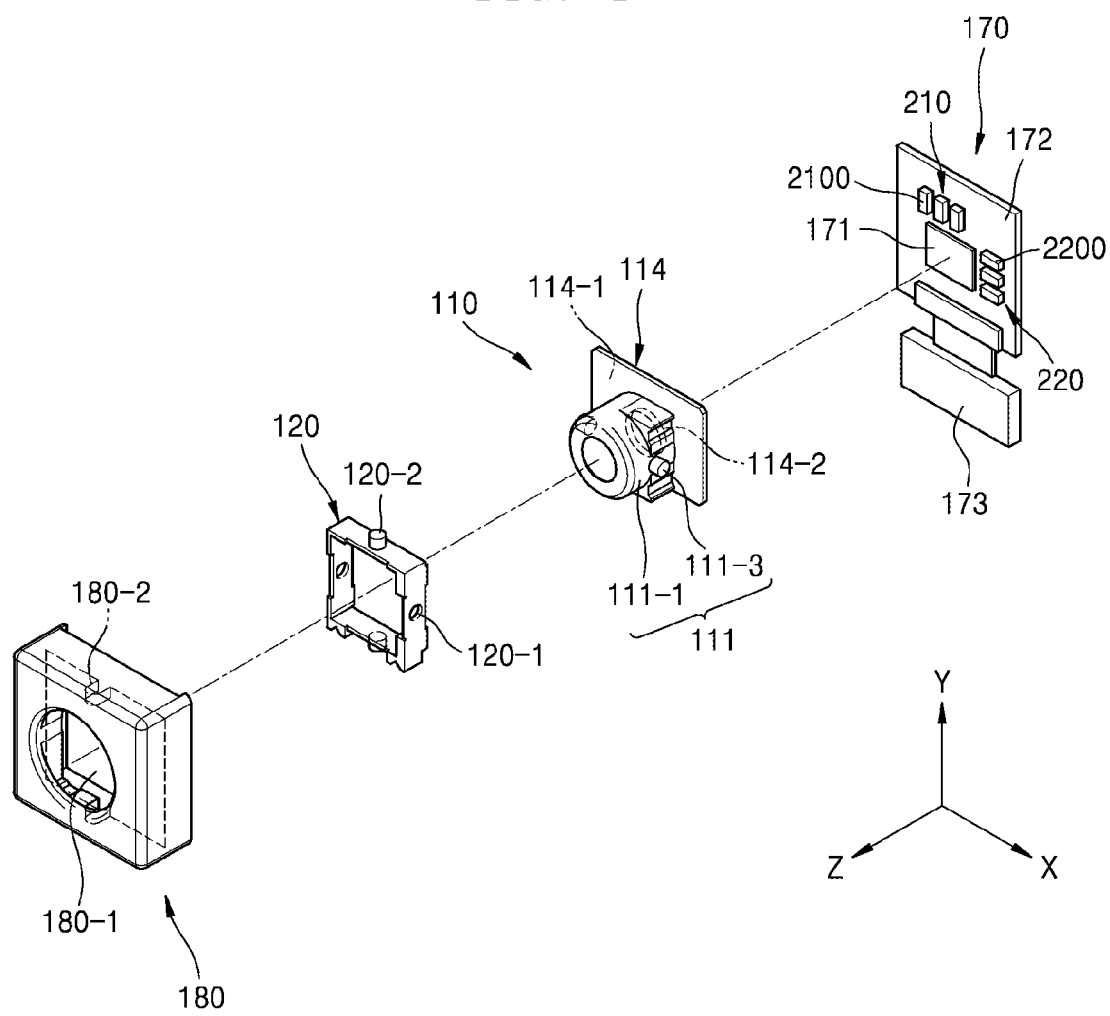
FIG. 4 is an exploded perspective view of a photographing apparatus module.

FIG. 2 is a block diagram of a structure of the photographing apparatus module 10. FIG. 3 is a perspective view of the photographing apparatus module 10. FIG. 4 is an exploded perspective view of the photographing apparatus module 10.

Referring to FIGS. 2 through 4, the photographing apparatus module 10 may include a photographing apparatus 100 configured to photograph a still image or a video, an image stabilization module 200, and a controller 300 configured to control an operation of the photographing apparatus module 10.

The photographing apparatus 100 according to an embodiment may include a lens module 110 including a plurality of lens groups, a first case unit 120 for accommodating the lens module 110, an image sensor module 170, and a second case unit 180 for accommodating the lens module 110 and the image sensor module 170.

The lens module 110 according to an embodiment may include a lens barrel unit 111 extending, for example, in an optical axis direction Z of light that is incident, a zoom lens module 112 disposed inside the lens barrel unit 111, a focal adjustment operating unit 113 (hereinafter, referred to as an AF operating unit) for automatically adjusting a focal point of a subject, and a plurality of contact units 114 and 115 contacting image stabilization driving units 210 and 220, which are to be described later.

The lens barrel unit 111 is an accommodation member for accommodating a plurality of lenses. The lens barrel unit 111 may include a cylinder-shaped accommodation unit 111-1 extending in the optical axis direction Z of incident light, and a first slide shaft 111-3 extending in a first direction X.

The zoom lens module 112 is a lens unit arranged in the optical axis direction Z of incident light. The zoom lens module 112 may include a zoom lens unit 112-1, and a zoom lens driving unit 112-2 configured to shift the zoom lens unit 112-1 in the optical axis direction Z of incident light. The zoom lens unit 112-1 may be arranged in the lens barrel unit 111 while being fixed to a zoom lens frame (not shown), and may be shifted in the optical axis direction Z of incident light by the zoom lens driving unit 112-2 so that a relative position with other optical systems may be changed. Accordingly, the zoom lens module 112 may perform a zooming or a telephoto function.

The AF operating unit 113 is a focal adjustment unit for automatically adjusting a focal point of a subject. The AF operating unit 113 may include an AF lens unit 113-1 arranged in the optical axis direction Z of incident light, and an AF driving unit 113-2 configured to shift the AF lens unit 113-1 in the optical axis direction Z of incident light. For example, the AF lens unit 113-1 may be arranged in the lens barrel unit 111 while being fixed to an AF frame (not shown), and may perform a focal adjustment function with respect to a subject by shifting the AF lens unit 113-1 in the optical axis direction Z of incident light. However, the disclosure is not limited thereto. Optical structures and lens driving structures for focal adjustment, and optical structures and lens driving structures for zoom adjustment may include various structures well-known in the art.

The contact unit 114 may be arranged at a rear surface of the lens barrel unit 111 and may transmit a driving force to the lens barrel unit 110 by contacting the image stabilization driving units 210 and 220 to be described later. For example, a first contact unit 114-1 may be provided as a shape of a substrate including an opening unit and may be arranged at the rear surface of the lens barrel unit 111. For example, the first contact unit 114-1 may be an area of the lens barrel unit 111. However, the present disclosure is not limited thereto. The first contact unit 114-1 may be formed as an additional substrate corresponding to a shape of a portion of the lens barrel unit 111. Also, a second contact unit 114-2 may be a cover glass including a transparent member and arranged in the opening unit of the first contact unit 114-1. However, the present disclosure is not limited thereto. The contact unit 114 may have any shape, by which driving force may be transmitted from the image stabilization driving units 210 and 220.

The first case unit 120 is an accommodation member for accommodating the lens barrel unit 110. For example, the first case unit 120 may include, at both side portions thereof, a first via-hole 120-1, into which the first slide shaft 111-3 may be inserted. Thus, a shift of the lens barrel unit 110 in the optical axis direction Z of incident light is restricted, while the lens barrel unit 110 may be shifted with respect to the first case unit 120 in the first direction X. Also, the first case unit 120 may include, at upper and lower portions thereof, a second slide shaft 120-2 extending in a second direction Y.

The image sensor module 170 may be fixedly coupled to the first case unit 120 and the second case unit 180 to be described later, and may include an image sensor 171 configured to receive image light that is incident to the lens module 110 and convert the received image light into an electrical signal, a sensor circuit substrate 172 to which the image sensor 171 is bonded, and a flexible circuit substrate 173 to which the sensor circuit substrate 172 is connected.

The image sensor 171 may include a photoelectric conversion device, such as a charged coupled device (CCD) or a complementary metal-oxide semiconductor (CMOS). An electrical signal generated by the image sensor 171 may be converted into image data by the controller 300 which will be described later.

For example, the controller 300 may convert the electrical signal of the image sensor 171 into RGB data and convert the RGB data into raw data, such as a YUV signal including a brightness signal and a chrominance signal. The conversion process by the controller 300 may include, for example, reducing driving noise of the image sensor module 170, which is included in the electrical signal, by using a correlated double sampling circuit, adjusting gains of the signal after the noise reduction by an automatic gain control circuit, converting an analog signal into a digital signal by using an analog to digital (A/D) converter, and detailed signal processing operations, such as correction of pixel defects, correction of gains, correction of white balance, and gamma correction, with respect to the digital signal.

The sensor circuit substrate 172 is a circuit substrate, on a surface of which the image sensor 171 may be arranged. For example, the sensor circuit substrate 172 may be a flat-shaped circuit substrate including a rigid material. For example, the sensor circuit substrate 172 may be fixed to the first case unit 120 and the second case unit 180 to be described later so that a relative position of the image sensor 171 and the lens module 110 arranged on the sensor circuit substrate 172 may be changed.

The flexible circuit substrate 173 is a connection circuit substrate for connecting the sensor circuit substrate 172 and the controller 300. The flexible circuit substrate 173 may be arranged between the sensor circuit substrate 172 and the controller 300 and may transmit an electrical signal generated by the image sensor 171 to the controller 300.

The second case unit 180 is an accommodation member for accommodating the first case unit 120. For example, the second case unit 180 may include, at a front surface portion thereof, an opening unit 180-1 through which incident light penetrates, and may include, at upper and lower portions thereof, a second via-hole 180-2, into which the second slide shaft 120-2 may be inserted. The first case unit 120 may be fixedly arranged in the second case unit 180, and the image sensor module 170 may be fixedly arranged in a rear surface portion of the second case unit 180. Here, the first case unit 120, in more detail, the lens module 110 may be shifted with respect to the second case unit 180 in the second direction Y, due to a driving force applied by the image stabilization driving units 210 and 220 that are to be described later. Also, an elastic member (not shown) may be arranged between the second case unit 180 and the lens module 110 so that a certain driving force may be applied between the lens module 110 and the second case unit 180.

The image stabilization module 200 is a correction device for preventing fading of an image, which occurs when the photographing apparatus module 10 is shaken for an exposure time period. The image stabilization module 200 may include devices using a digital image stabilization (DIS) method, an electrical image stabilization (EIS) method, and an optical image stabilization (OIS) method. Hereinafter, descriptions are made by focusing on the optical image stabilization method (the OIS method) which may correct a hand tremble of a user, by changing a path of light incident into the image sensor module 170.

The image stabilization module 200 according to an embodiment may include the first image stabilization driving unit 210 for correcting a hand tremble in the first direction X, the second image stabilization driving unit 220 for correcting a hand tremble in the second direction Y, a first-first sensor unit 231 and a first-second sensor unit 232 for detecting a degree of a hand tremble and a direction of a hand tremble, and a second-first sensor unit 241 and a second-second sensor unit 242 for measuring a displacement of shifts of the lens module 110 in the first direction X and the second direction Y.

The first image stabilization driving unit 210 is a driving unit configured to transmit a driving force in the first direction X to the lens module 110 by contacting the contact unit 114 included in the first lens barrel unit 111 in order to correct a hand tremble in the first direction X. For example, the first image stabilization driving unit 210 may include a plurality of first piezoelectric devices 2100 arranged apart from one another in the first direction X. Here, the first piezoelectric devices 2100 may be arranged on a first surface 172-1 of the sensor circuit substrate 172 to face the contact unit 114 and may contract or extend in the optical axis direction Z of incident light.

The second image stabilization driving unit 220 is a driving unit configured to transmit a driving force in the second direction Y to the lens module 110 by contacting the contact unit 114 included in the first lens barrel unit 111 in order to correct a hand tremble in the second direction Y. For example, the second image stabilization driving unit 220 may include a plurality of second piezoelectric devices 2200 arranged apart from one another in the second direction Y. Here, the second piezoelectric devices 2200 may be arranged on the first surface 172-1 of the sensor circuit substrate 172 to face the contact unit 114 and may contract or extend the optical axis direction Z of incident light.

In the present disclosure, it is described that the first and second piezoelectric devices 2100 and 2200 may be arranged on an upper portion or a side portion of the image sensor 171. However, the disclosure is not limited thereto. The first piezoelectric devices 2100 may be arranged on upper and lower portions of the image sensor 171, and the second piezoelectric devices 2200 may be arranged on both side portions of the image sensor 171. Since the first and second piezoelectric devices 2100 and 2200 are arranged to surround the image sensor 171 as described above, a greater driving force for image stabilization by the first and second piezoelectric devices 2100 and 2200 may be transmitted to the lens module 110.

For example, the first and second piezoelectric devices 2100 and 2200 may be a single layer piezoelectric body structure including any one selected from PZT, BaTiO3, (Ba,Sr) (TiO3), PMN, PT, and solid solution and relaxor ferroelectric thereof, or a multi-layer piezoelectric body structure including at least one thin layer including any one selected from the described piezoelectric materials. However, the disclosure is not limited thereto.

The first-first and first-second sensor units 231 and 232 are measuring units for measuring a degree and a direction of shift of the photographing apparatus module 10 due to the hand tremble. For example, the first-first sensor unit 231 is a sensing device for measuring a degree of shift of the photographing apparatus module 10 in the first direction X, and the first-second sensor unit 232 is a sensing device for measuring a degree of shift of the photographing apparatus module in the second direction Y. The first-first and first-second sensor units 231 and 232 may include, for example, gyro sensors. However, the disclosure is not limited thereto.

The second-first and second-second sensor units 241 and 242 are measuring units for measuring a degree and a direction of shift of the lens module 110 by the first and second image stabilization driving units 210 and 220. For example, the second-first sensor unit 241 is a sensing device for measuring a degree of shift of the lens module 110 in the first direction X by the first image stabilization driving unit 210, and the second-second sensor unit 242 is a sensing device for measuring a degree of shift of the lens module 110 in the second direction Y by the second image stabilization driving unit 220. The second-first and second-second sensor units 241 and 242 may include, for example, hall sensors. However, the disclosure is not limited thereto.

The controller 300 is a controller for controlling operations of the photographing apparatus 100 and the driving module 200. For example, the controller 300 may include random access memory (RAM), read only memory (ROM), a central processing unit (CPU), and a bus. The RAM, the ROM, and the CPU may be connected with one another via the bus. However, the disclosure is not limited thereto.

In the present disclosure, in order to specify an image by converting an electrical signal of the image sensor module 170 into a data signal, and perform a zooming function, a subject focal adjustment function, and an image stabilization function, the controller 300 may receive a sensing signal transmitted from the first-first and first-second sensor units 231 and 232 and the second-first and second-second sensor units 241 and 242. Also, the controller 300 may transmit a control signal to a driving unit included in each of the lens module 100 and the image stabilization module 200. In this way, the controller 300 may control operations of the zoom lens module 112, the AF driving unit 113, the first image stabilization driving unit 210, and the second image stabilization driving unit 220.

Figure 5A:
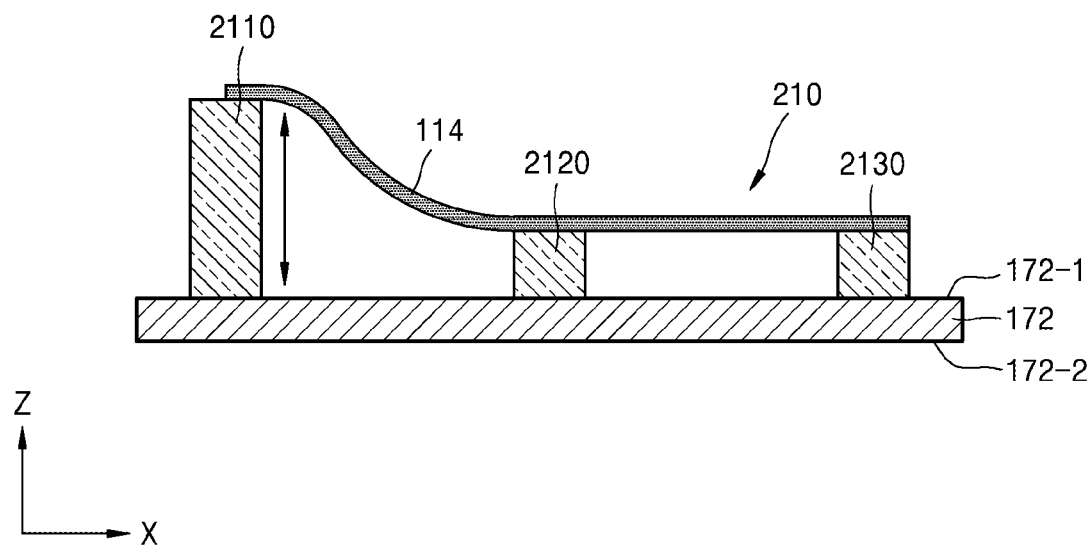
FIGS. 5A through 5C are sectional side views of a first image stabilization driving unit.
Figure 5B:
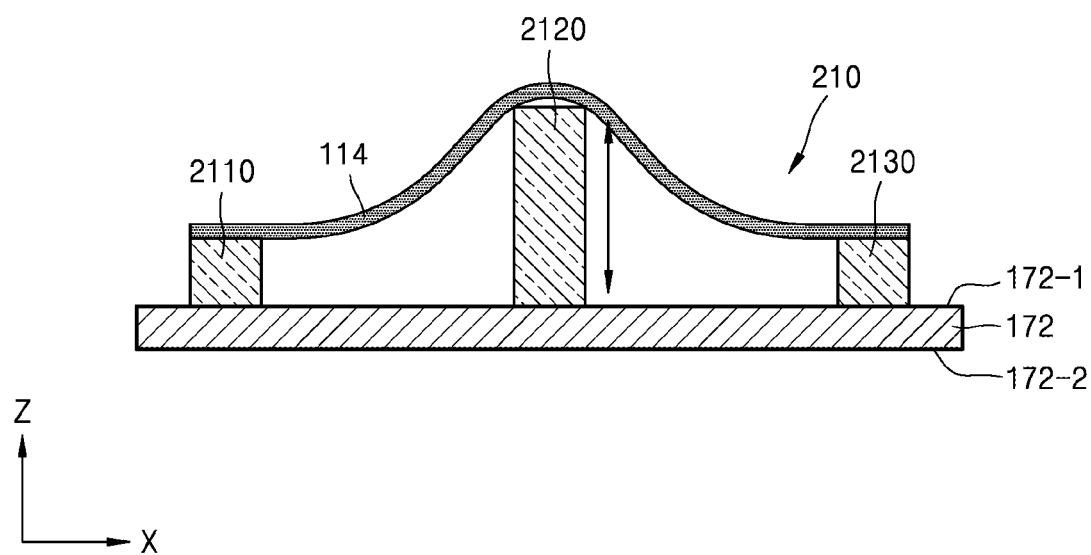
Figure 5C:
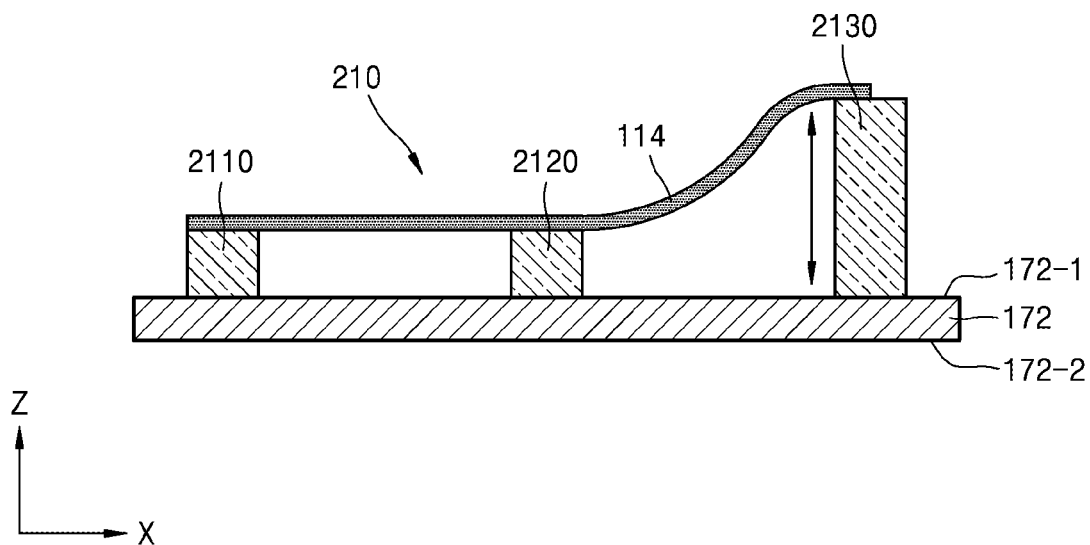
Figure 6A:
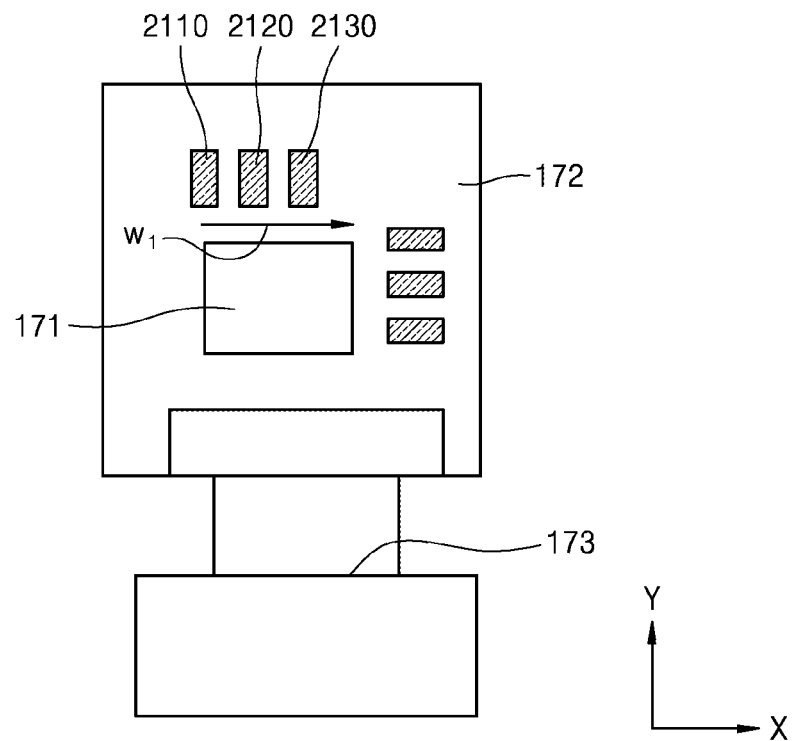
FIG. 6A is a front view of an image stabilization driving unit and an image sensor module.
Figure 6B:
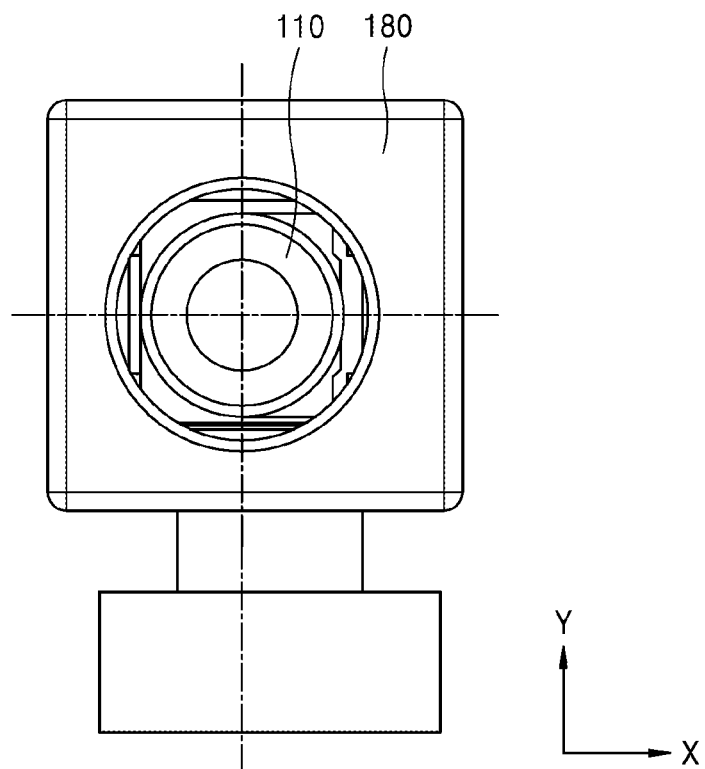
FIGS. 6B and 6C are front views of a photographing apparatus module.
Figure 6C:
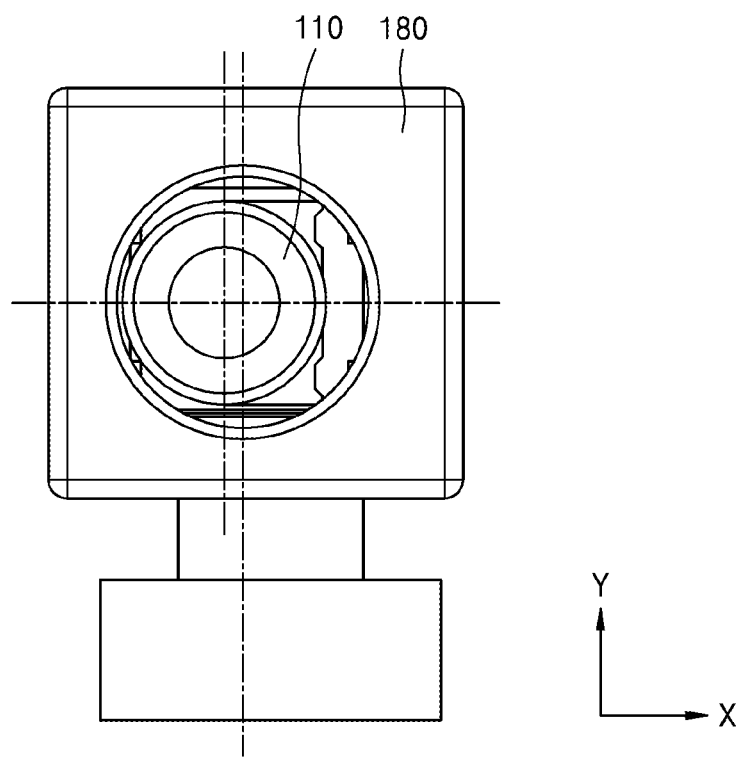
Figure 7A:
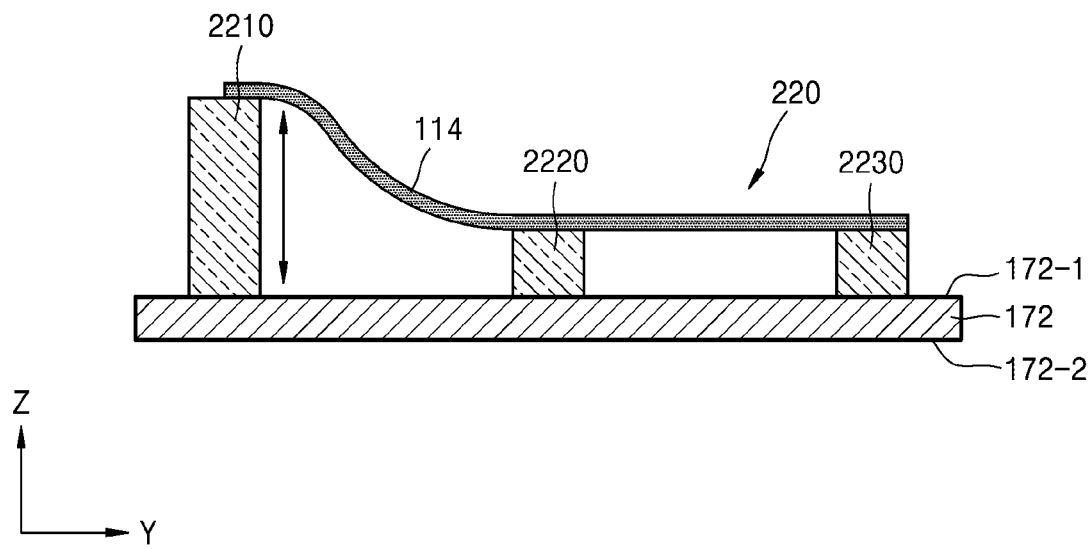
FIGS. 7A through 7C are sectional side views of a second image stabilization driving unit.
Figure 7B:
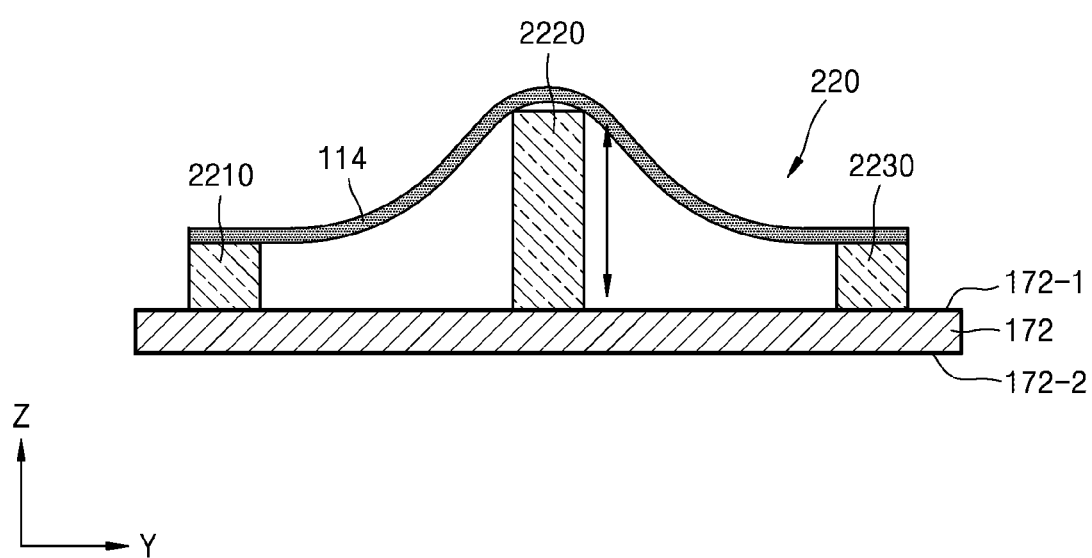
Figure 7C:
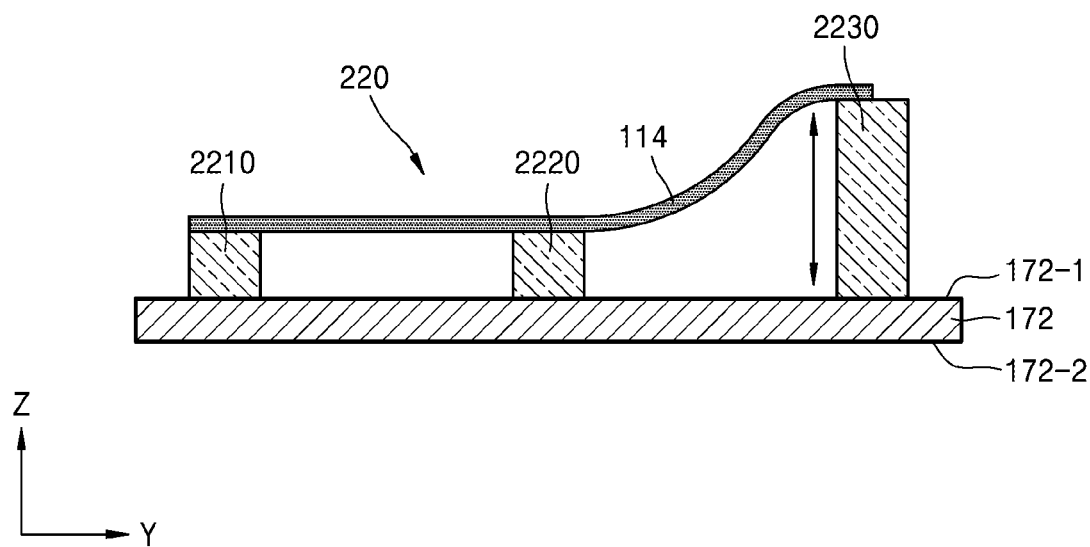
Figure 8A:
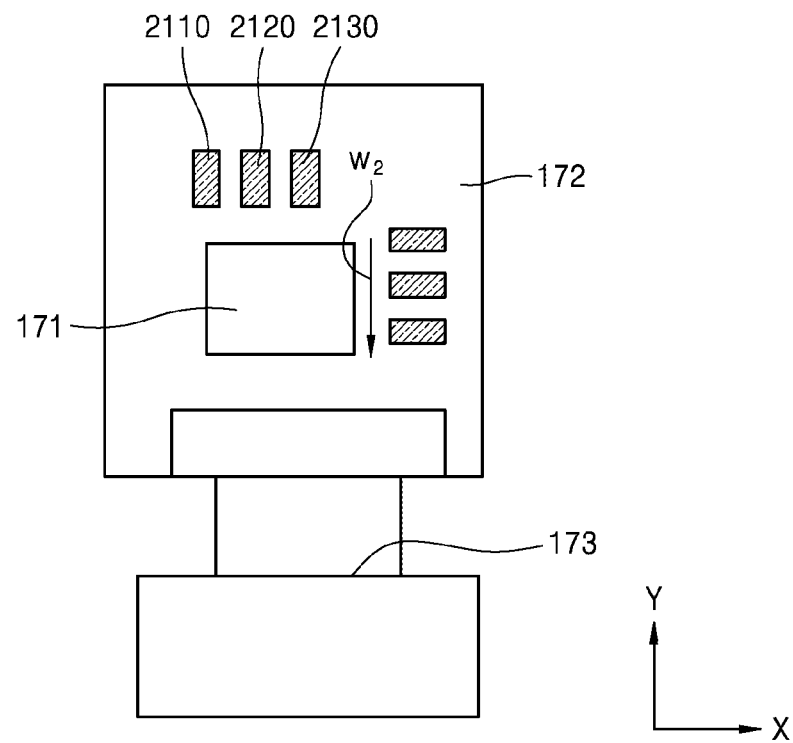
FIG. 8A is a front view of an image stabilization driving unit and an image sensor module.
Figure 8B:
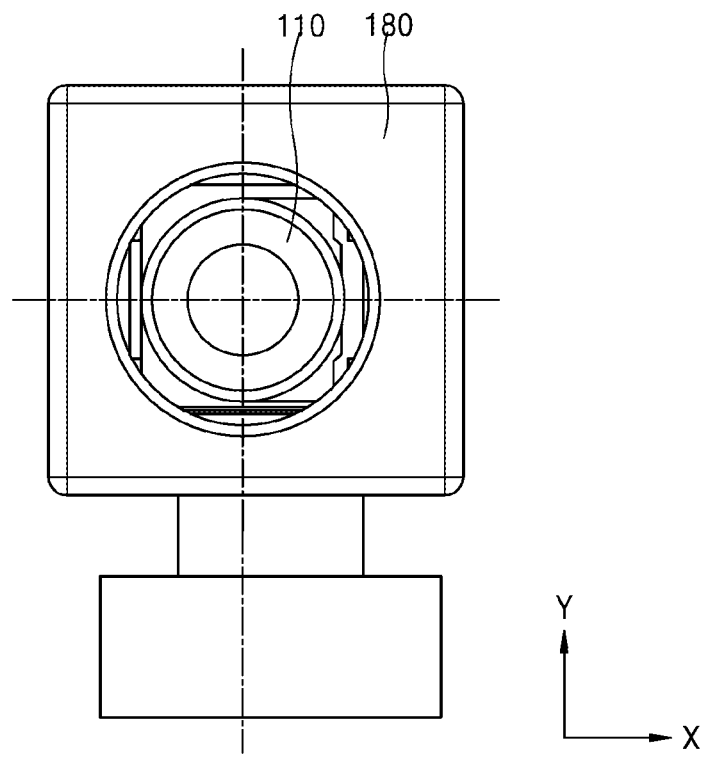
FIGS. 8B and 8C are front views of a photographing apparatus module.
Figure 8C:
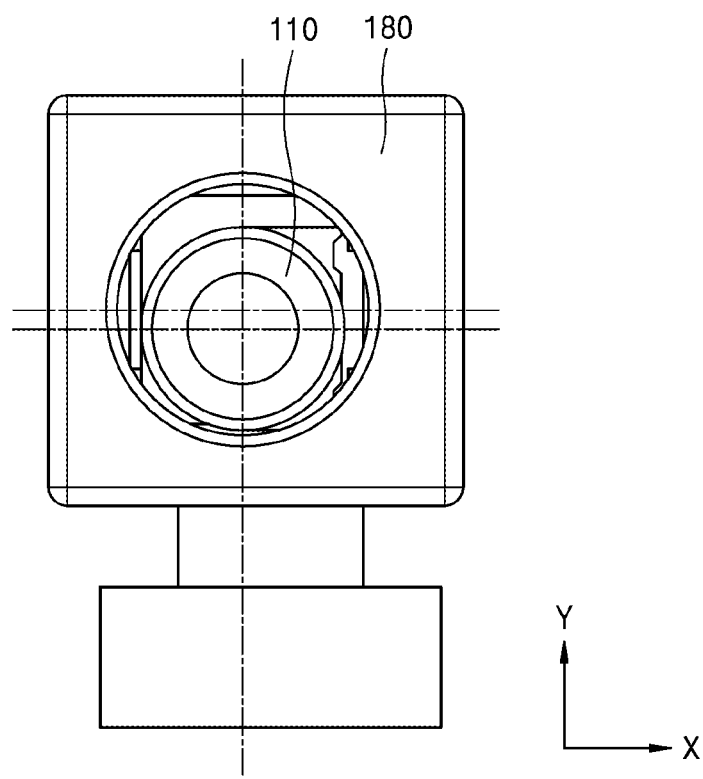

FIGS. 5A through 5C are sectional side views of the first image stabilization driving unit 210. FIG. 6A is a front view of the image stabilization driving units 210 and 220 and the image sensor module 170. FIGS. 6B and 6C are front views of the photographing apparatus module 10. FIGS. 7A through 7C are sectional side views of the second image stabilization driving unit 220. FIG. 8A is a front view of the image stabilization driving units 210 and 220 and the image sensor module 170 according to an embodiment. FIGS. 8B and 8C are front views of the photographing apparatus module 10.

As described above, when the photographing apparatus module 10 is shifted in a certain direction due to a hand tremble of a user so that incident light is not formed in the same location of the image sensor 171, a location in which the incident light is formed may be corrected by changing a relative position of the lens module 110 with respect to the image sensor module 170. Referring to FIGS. 2 and 6A through 6C, when the first-first sensor 231 senses a shift of the photographing apparatus module 10 in the first direction X due to a hand tremble, the controller 300 may receive the sensing signal, generate a driving signal with respect to the first image stabilization driving unit 210, and transmit the driving signal to the first image stabilization driving unit 210. For example, the first image stabilization driving unit 210 may include first-first through first-third piezoelectric devices 2110 through 2130, which may be arranged apart from one another in the first direction X.

A voltage having a certain phase difference may be applied to each of the first-first through first-third piezoelectric devices 2110 through 2130 by the controller 300, and thus, a driving force in the first direction X may be generated. For example, as illustrated in FIGS. 5A through 5C, when the voltage having a certain phase difference is applied to each of the first-first through first-third piezoelectric devices 2110 through 2130, first, the first-first piezoelectric device 2110 may extend. Then, the first-second piezoelectric device 2120 may extend while the first-first piezoelectric device 2110 contracts. Thereafter, the first-third piezoelectric device 2130 may extend while the first-second piezoelectric device 2120 contracts.

As the first-first through first-third piezoelectric devices 2110 through 2130 sequentially extend and contract, a traveling wave $W_1$ with respect to the first direction X may be generated. Here, the contact unit 114 is arranged to contact the first-first through first-third piezoelectric devices 2110 through 2130, and thus, the contact unit 114 may transmit a driving force in the first direction X due to the traveling wave $W_1$ of the first direction X to the lens module 110. The lens module 110 may be shifted in the first direction X due to the driving force in the first direction X transmitted by the first contact unit 114. Here, the second-first sensor unit 241 may sense an amount of shift of the lens module 110 in the first direction X. Based on this, a relative position between the lens module 110 and the image sensor 171 in the first direction X may be corrected.

Referring to FIGS. 2 and 8A through 8C, when the first-second sensor 232 senses a shift of the photographing apparatus module 10 in the second direction Y due to a hand tremble, the controller 300 may receive the sensing signal, generate a driving signal with respect to the second image stabilization driving unit 220, and transmit the driving signal to the second image stabilization driving unit 220. For example, the second image stabilization driving unit 220 may include second-first through second-third piezoelectric devices 2210 through 2230, which may be arranged apart from one another in the second direction Y.

A voltage having a certain phase difference may be applied to each of the second-first through second-third piezoelectric devices 2210 through 2230 by the controller 300, and thus, a driving force in the second direction Y may be generated. For example, as illustrated in FIGS. 7A through 7C, when the voltage having a certain phase difference is applied to each of the second-first through second-third piezoelectric devices 2210 through 2230, first, the second-first piezoelectric device 2210 may extend. Then, the second-second piezoelectric device 2220 may extend while the second-first piezoelectric device 2210 contracts. Thereafter, the second-third piezoelectric device 2230 may extend while the second-second piezoelectric device 2220 contracts.

As the second-first through second-third piezoelectric devices 2210 through 2230 sequentially extend and contract, a traveling wave $W_2$ with respect to the second direction Y may be generated. Here, the second contact unit 115 is arranged to contact the second-first through second-third piezoelectric devices 2210 through 2230, and thus, the second contact unit 115 may transmit a driving force in the second direction Y due to the traveling wave $W_2$ of the second direction Y to the lens module 110. The lens module 110 may be shifted in the second direction Y due to the driving force in the second direction Y transmitted by the second contact unit 115. Here, the second-second sensor unit 242 may sense an amount of shift of the lens module 110 in the second direction Y. Based on this, a relative position between the lens module 110 and the image sensor 171 in the second direction Y may be corrected.

Figure 9:
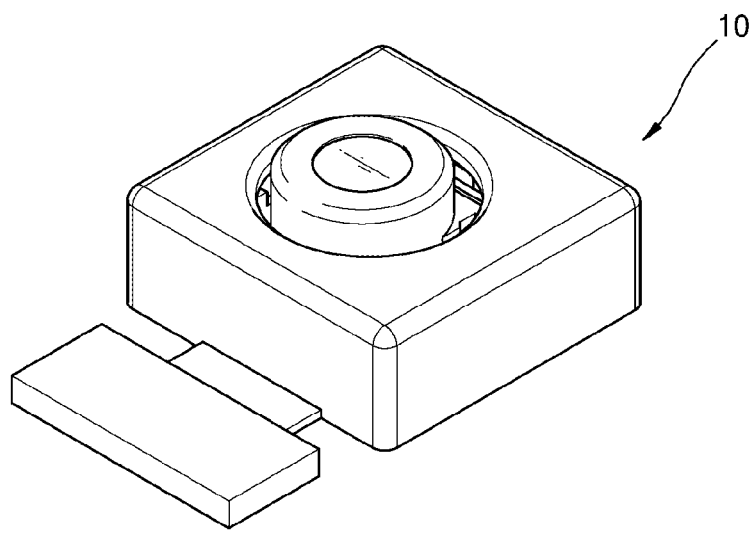
FIG. 9 is a perspective view of a photographing apparatus module according to another embodiment.
Figure 10:
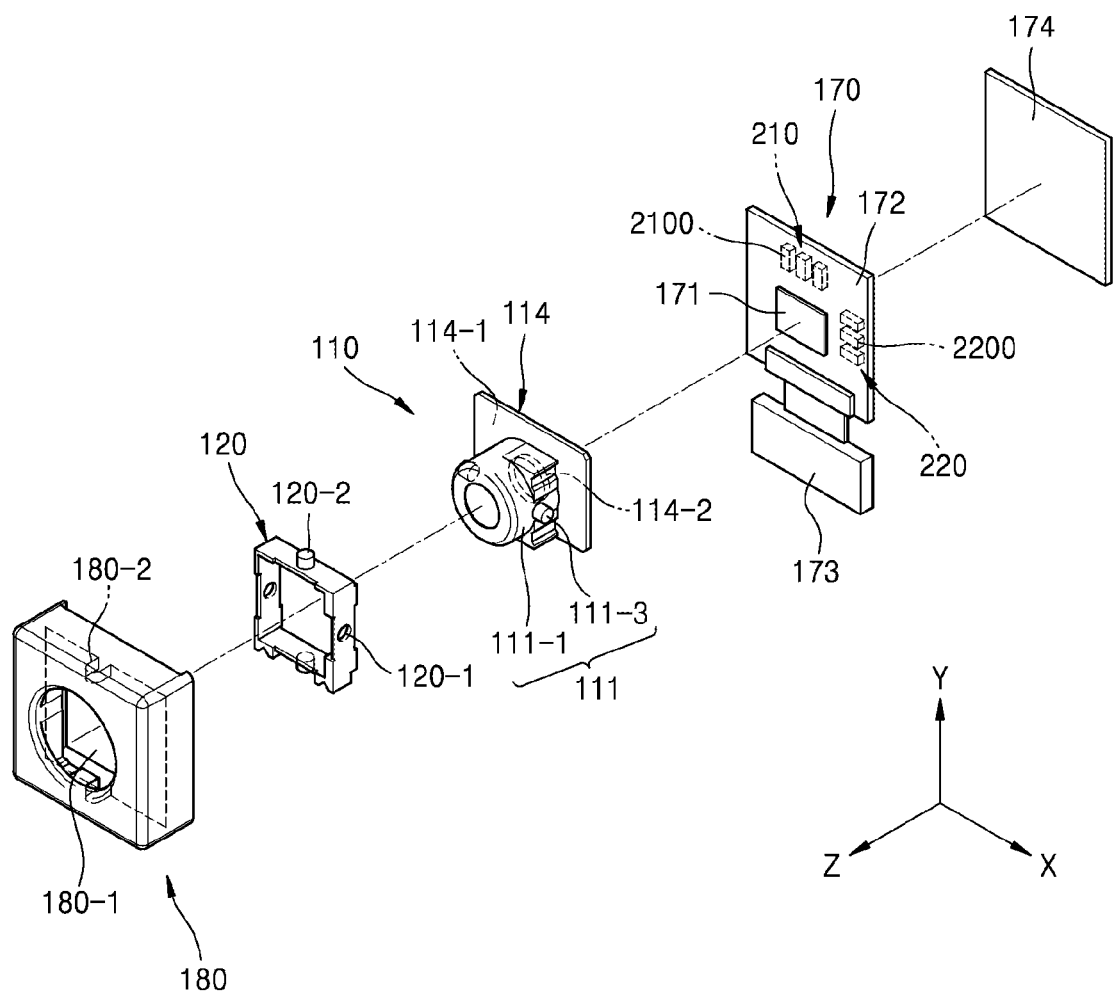
FIG. 10 is an exploded perspective view of a photographing apparatus module.

FIG. 9 is a perspective view of the photographing apparatus module 10 according to another embodiment. FIG. 10 is an exploded perspective view of the photographing apparatus module 10 according to another embodiment.

Referring to FIGS. 2, 9 and 10, the photographing apparatus module 10 may include the photographing apparatus 100 for photographing a still image or a video, the image stabilization module 200, and the controller 300 for controlling an operation of the photographing apparatus module 10.

The photographing apparatus 100 may include the lens module 110 including a plurality of lens groups, the first case unit 120 for accommodating the lens module 110, the image sensor module 170, and the second case unit 180 for accommodating the lens module 110 and the image sensor module 170. Except the image sensor module 170, the components of the photographing apparatus module 10 according to the present embodiment are substantially the same as the components of the photographing apparatus module 10 according to the embodiment described earlier, and thus, detailed descriptions thereof will be omitted for convenience of explanation.

The image sensor module 170 according to the present embodiment is fixedly coupled to the first case unit 120 and the second case unit 180, and may include the image sensor 171 for receiving image light that is incident to the lens module 110 and converting the image light into an electrical signal, the sensor circuit substrate 172, to which the image sensor 171 is bonded, the flexible circuit substrate 173, to which the sensor circuit substrate 172 is connected, and a support substrate 174. Except the sensor circuit substrate 172 and the support substrate 174, the components of the image sensor module 170 according to the present embodiment are substantially the same as the components of the image sensor module 170 according to the embodiment described earlier, and thus, detailed descriptions thereof will be omitted for convenience of explanation.

The sensor circuit substrate 172 according to the present embodiment is a circuit substrate. The image sensor 171 may be arranged on the first surface 172-1 of the sensor circuit substrate 172, and the first and second image stabilization driving units 210 and 220 may be arranged on a second surface 172-2 of the sensor circuit substrate 172. For example, the sensor circuit substrate 172 may be a flat circuit substrate including a flexible material. For example, the sensor circuit substrate 172 may be arranged to be fixed to the first case unit 120 and the support substrate 174 to be described as follows.

The support substrate 174 is a supporting member having a flat shape, which is arranged to face the second surface 172-2 of the sensor circuit substrate 172. For example, the first and second image stabilization driving units 210 and 220 arranged on the second surface 172-2 of the sensor circuit substrate 172 may be supported by the support substrate 174, and the support substrate 174 may be arranged to be fixed to the second case unit 180.

The image stabilization module 200 according to the present embodiment may include the first image stabilization driving unit 210 for correcting a hand tremble in the first direction X, the second image stabilization driving unit 220 for correcting a hand tremble in the second direction Y, the first-first and first-second sensor units 231 and 232 for detecting a degree and a direction of the hand tremble, and the second-first and second-second sensor units 241 and 242 for measuring a displacement of shifts of the lens module 110 in the first direction X and the second direction Y.

For example, the first image stabilization driving unit 210 may include the plurality of first piezoelectric devices 2100 arranged apart from one another in the first direction X. Here, the first piezoelectric devices 2100 may contract or extend in the optical axis direction Z of incident light. Also, the first piezoelectric devices 2100 may be arranged on the second surface 172-2 of the sensor circuit substrate 172, which is arranged to face the support substrate 174, as described above.

For example, the second image stabilization driving unit 220 may include the plurality of second piezoelectric devices 2200 arranged apart from one another in the second direction Y. Here, the second piezoelectric devices 2200 may contract or extend in the optical axis direction Z of incident light. Also, the second piezoelectric devices 2200 may be arranged on the second surface 172-2 of the sensor circuit substrate 172, which is arranged to face the support substrate 174, as described above. Except the arrangement of the first and second piezoelectric devices 2100 and 2200, the components of the image stabilization module 200 according to the present embodiment are substantially the same as the components of the image stabilization module 200 described according to the earlier embodiment, and thus, detailed descriptions thereof will be omitted for convenience of explanation.

Figure 11A:
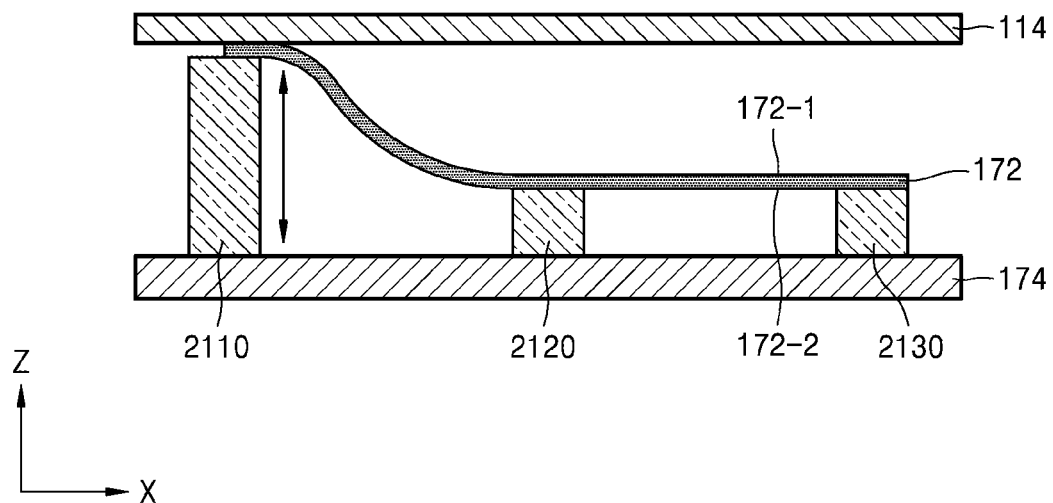
FIGS. 11A through 11C are sectional side views of a first image stabilization driving unit.
Figure 11B:
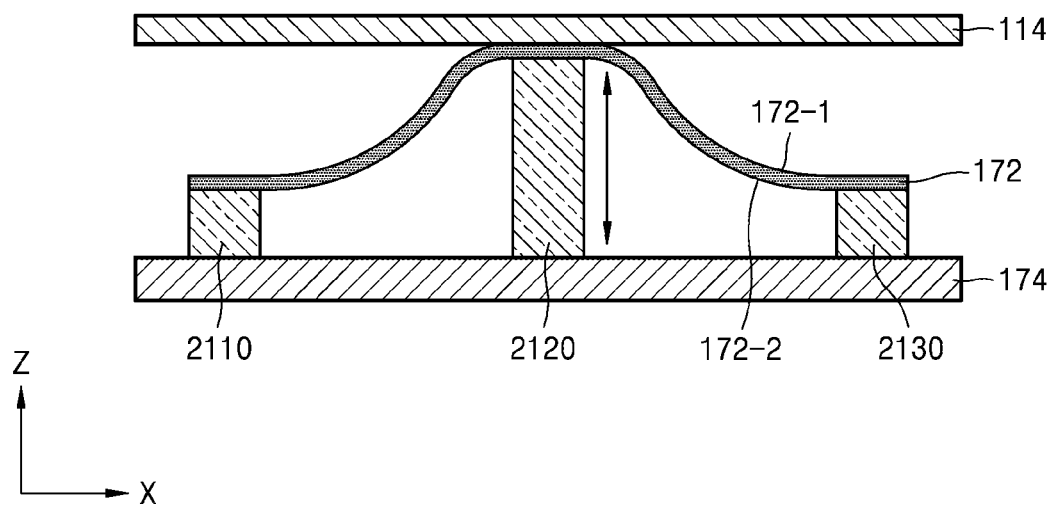
Figure 11C:
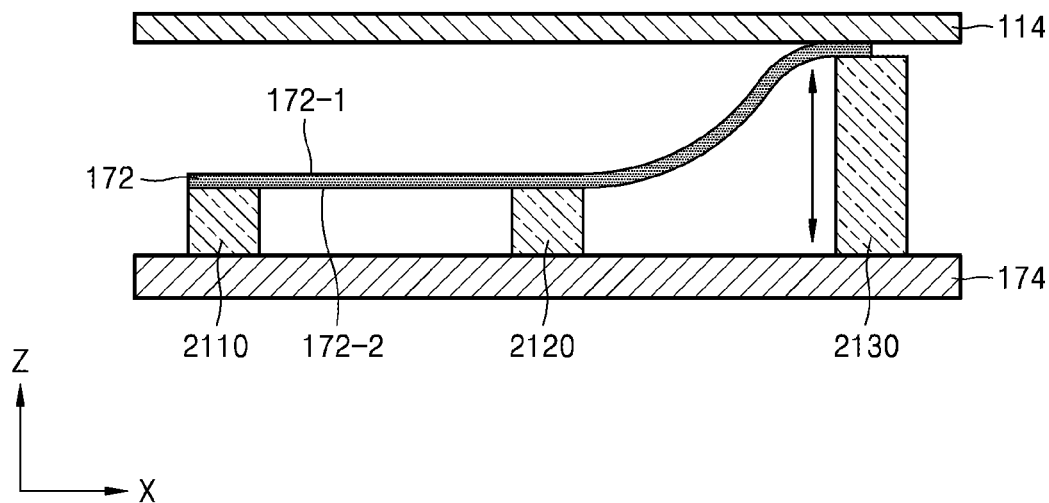
Figure 12:
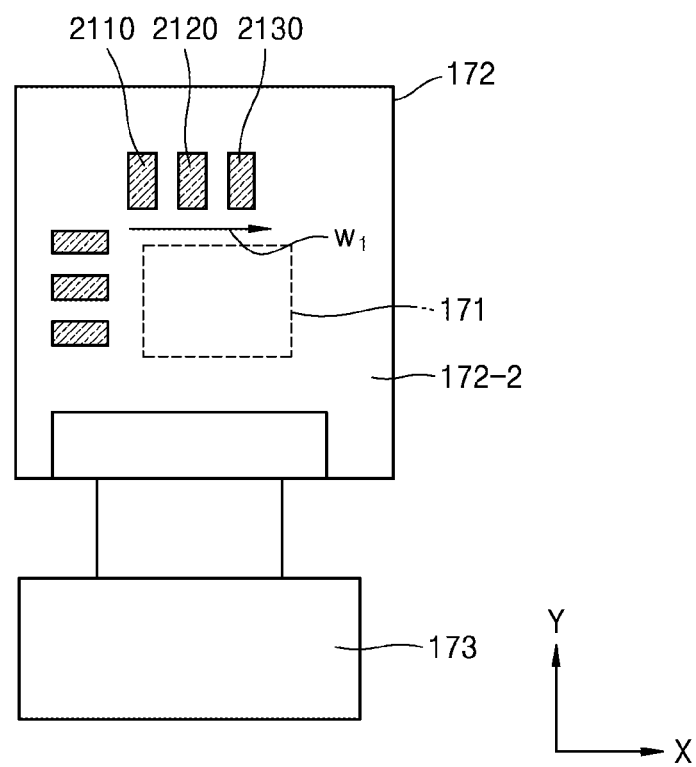
FIG. 12 is a rear view of an image stabilization driving unit and an image sensor module.
Figure 13:
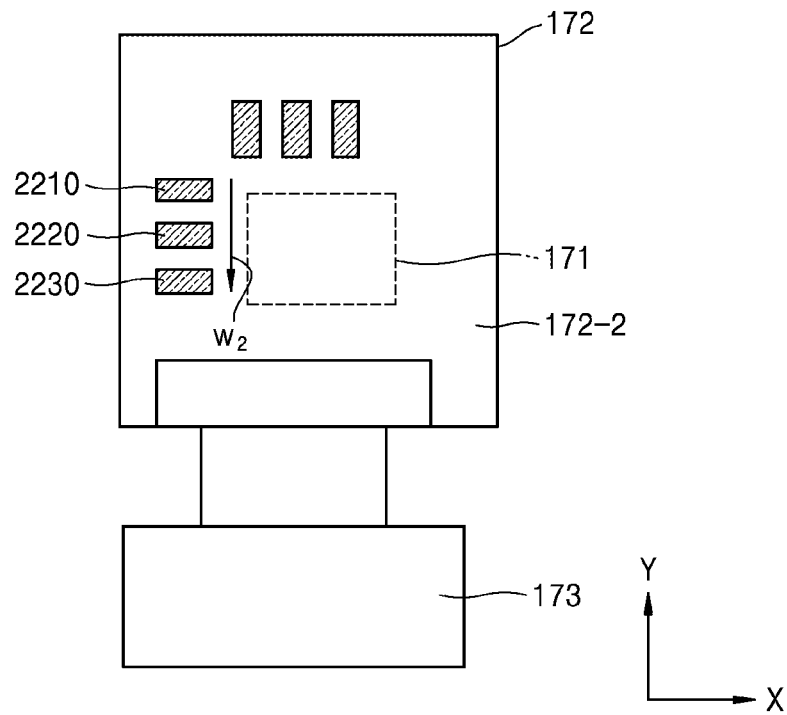
FIG. 13 is a rear view of an image stabilization driving unit and an image sensor module.
Figure 14:
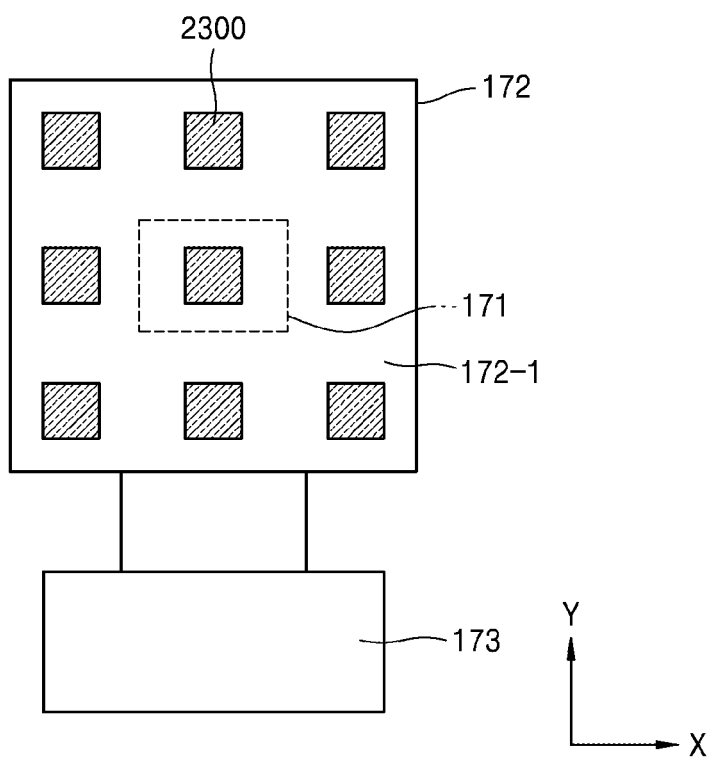
FIG. 14 is a rear view of an image stabilization driving unit and an image sensor module.

FIGS. 11A through 11C are sectional side views of the first image stabilization driving unit 210 according to another embodiment. FIG. 12 is a rear view of the image stabilization driving units 210 and 220 and the image sensor module 170 according to another embodiment. FIG. 13 is a rear view of the image stabilization driving units 210 and 220 and the image sensor module 170 according to another embodiment. FIG. 14 is a rear view of the image stabilization driving units 210 and 220 and the image sensor module 170 according to another embodiment.

Referring to FIGS. 2, 6B, 6C, and 12, when the first-first sensor 231 senses a shift of the photographing apparatus module 10 in the first direction X due to a hand tremble, the controller 300 may receive the sensing signal, generate a driving signal for the first image stabilization driving unit 210, and transmit the driving signal to the first image stabilization driving unit 210. For example, the first image stabilization driving unit 210 may include the first-first through first-third piezoelectric devices 2110 through 2130, and the first-first through first-third piezoelectric devices 2110 through 2130 may be arranged on the second surface 172-2 of the sensor signal substrate 172 in the first direction X to be apart from one another.

A voltage having a certain phase difference may be applied to each of the first-first through first-third piezoelectric devices 2110 through 2130 by the controller 300 in order to generate a driving force with respect to the first direction X. For example, as illustrated in FIGS. 11A through 11C, when the voltage having a certain phase difference is applied to each of the first-first through first-third piezoelectric devices 2110 through 2130, first, the first-first piezoelectric device 2110 may extend. Then, the first-second piezoelectric device 2120 may extend while the first-first piezoelectric device 2110 contracts. Thereafter, the first-third piezoelectric device 2130 may extend while the first-second piezoelectric device 2120 contracts. As the first-first through first-third piezoelectric devices 2110 through 2130 extend and contract, the sensor circuit substrate 172 including a flexible material may also be changed according to the optical axis direction Z of incident light.

As the first-first through first-third piezoelectric devices 2110 through 2130 sequentially extend and contract, a traveling wave $W_1$ with respect to the first direction X may be generated. Here, a portion of the sensor signal substrate 172 may contact the contact unit 114 since the sensor signal substrate 172 is changed due to the traveling wave $W_1$ with respect to the first direction X. Accordingly, the contact unit 114 may transmit a driving force in the first direction X due to the traveling wave $W_1$ of the first direction X to the lens module 110. The lens module 110 may be shifted in the first direction X due to the driving force in the first direction X transmitted by the first contact unit 114. Here, the second-first sensor unit 241 may sense an amount of shift of the lens module 110 in the first direction X so that a relative position between the lens module 110 and the image sensor 171 in the first direction X may be corrected.

Referring to FIGS. 2, 8B, 8C, and 13, when the first-second sensor 232 senses a shift of the photographing apparatus module 10 in the second direction Y due to a hand tremble, the controller 300 may receive the sensing signal, generate a driving signal with respect to the second image stabilization driving unit 220, and transmit the driving signal to the second image stabilization driving unit 220. For example, the second image stabilization driving unit 220 may include the second-first through second-third piezoelectric devices 2210 through 2230, which may be arranged on the second surface 172-2 of the sensor signal substrate 172 in the second direction Y to be apart from one another. Transmitting a driving force to the lens module 110 in the second direction Y by the extension and contraction of the second-first through second-third piezoelectric devices 2210 through 2230 is substantially the same as transmitting the driving force in the first direction X, and thus, detailed descriptions thereof will be omitted for convenience of explanation.

As another example, referring to FIG. 14, a plurality of piezoelectric devices 2300 may be arranged on the second surface 172-2 of the sensor circuit substrate 172 to be apart from one another, as a lattice shape. Accordingly, the contact unit 114 may receive a greater driving force from the plurality of piezoelectric devices 2300. An operation method of the plurality of piezoelectric devices 2300 arranged as the lattice shape is substantially the same as an operation method of a plurality of fourth piezoelectric devices 2400 to be described later, and thus, detailed descriptions thereof will be omitted here.

Figure 15:
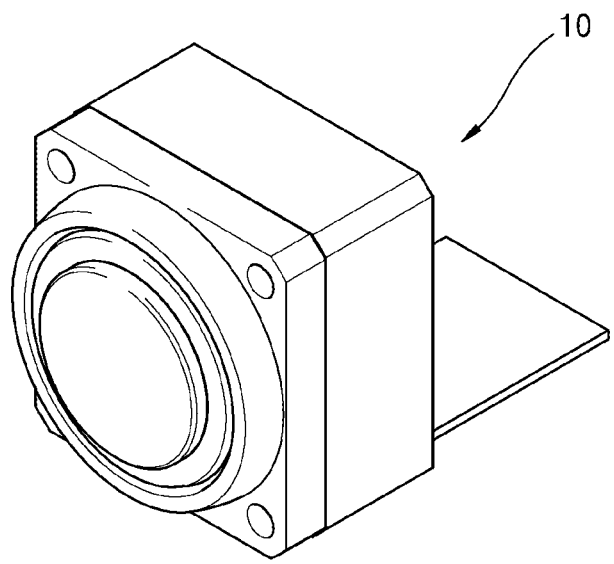
FIG. 15 is a perspective view of a photographing apparatus module.
Figure 16:
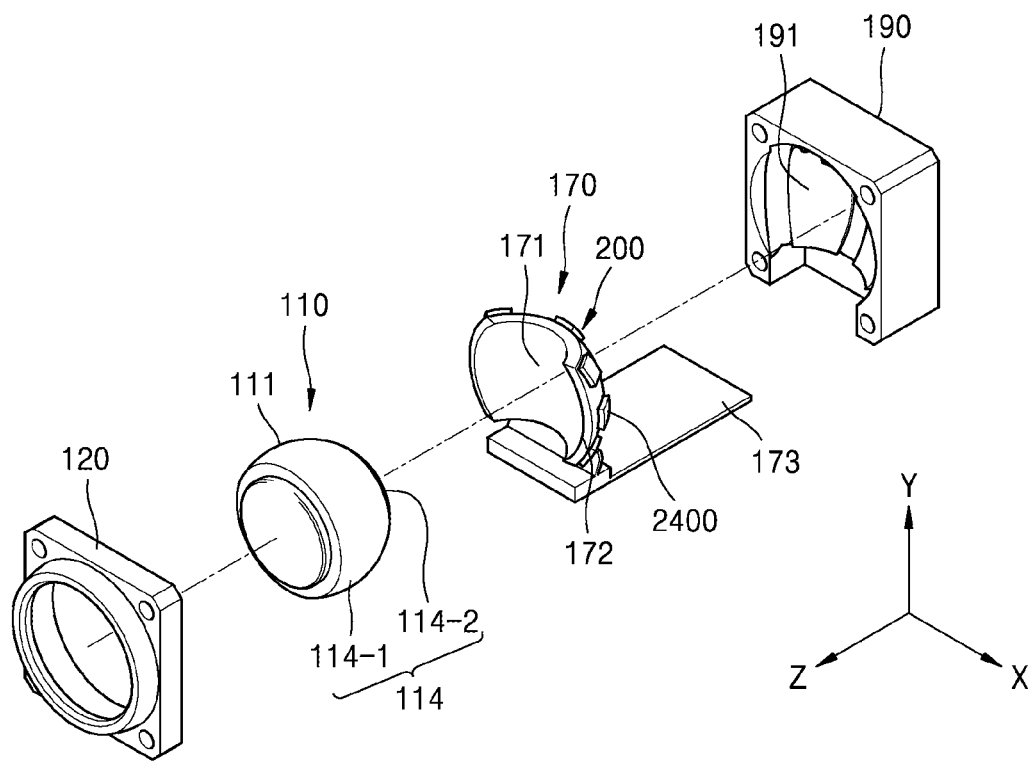
FIG. 16 is an exploded perspective view of a photographing apparatus module.

FIG. 15 is a perspective view of the photographing apparatus module 10 according to another embodiment. FIG. 16 is an exploded perspective view of the photographing apparatus module 10 according to another embodiment.

Referring to FIGS. 2, and 15 and 16, the photographing apparatus module 10 may include the photographing apparatus 100 configured to photograph a still image or a video, the image stabilization module 200, and the controller 300 configured to control the operation of the photographing apparatus module 10.

The photographing apparatus 100 according to the present embodiment may include the lens module 110 including a plurality of lens groups, the first case unit 120 for accommodating the lens module 110, the image sensor module 170, and a support unit 190 for accommodating the lens module 110 and the image sensor module 170.

The lens module 110 may include the lens barrel unit 111 extending, for example, in the optical axis direction Z of light that is incident, the zoom lens module 112 disposed inside the lens barrel unit 111, the focal adjustment operating unit 113 for automatically adjusting a focal point of a subject, and the contact unit 114.

The lens barrel unit 111 is an accommodation member for accommodating the plurality of lenses. The lens barrel unit 111 may have a spherical shape, in which an opening through which the incident light may penetrate is formed in the optical axis direction Z of incident light.

The first case unit 120 is an accommodation member for accommodating the lens module 110. For example, the first case unit 120 may be formed as a spherical shape including an opening through which incident light may penetrate, and may accommodate the lens barrel unit 111. For example, the lens module 110, in more detail, the lens barrel unit 111 may be accommodated in the first case unit 120 and may be tilted based on the first direction X or the second direction Y.

The contact unit 114 may be arranged at a rear surface of the lens barrel unit 111 and may contact image stabilization driving units 210 and 220 to transmit a driving force to the lens barrel unit 110. For example, the first contact unit 114-1 may be provided as a shape of a half-sphere including an opening unit and may be arranged at the rear surface of the lens barrel unit 111. For example, the first contact unit 114-1 may be an area of the lens barrel unit 111. However, the present disclosure is not limited thereto. The first contact unit 114-1 may be formed as an additional substrate having a semi-spherical shape corresponding to a shape of a portion of the lens barrel unit 111. Also, the second contact unit 114-2 may be a cover glass including a transparent member and arranged in the opening unit of the first contact unit 114-1. However, the present disclosure is not limited thereto. The contact unit 114 may include any shape, by which a driving force may be transmitted from the image stabilization driving units 210 and 220.

The image sensor module 170 may include the image sensor 171 configured to receive image light that is incident to the lens module 110 and convert the received image light into an electrical signal, the sensor circuit substrate 172 to which the image sensor 171 is bonded, and the flexible circuit substrate 173 to which the sensor circuit substrate 172 is connected. The image sensor module 170 is fixedly coupled to the support unit 190 to be described later.

The sensor circuit substrate 172 is a circuit substrate, on a surface of which the image sensor 171 may be arranged. For example, the sensor circuit substrate 172 may be a circuit substrate having a semi-spherical shape and including a flexible material. For example, the sensor circuit substrate 172 may be arranged to be fixed to the support unit 190 to be described later so that a relative position of the image sensor 171 and the lens module 110 arranged on the sensor circuit substrate 172 may be changed.

The support unit 190 is an accommodation member configured to accommodate the lens module 110 and the image sensor module 170. The support unit 190 may be coupled the first case unit 120. For example, the support unit 190 may be formed as a housing shape and may be coupled to the first case unit 120. A rear surface portion 191 of the support unit 190, which faces the sensor circuit substrate 172, may be formed as a semi-spherical shape corresponding to a shape of the sensor circuit substrate 172. The image sensor module 170 may be fixedly arranged in the support unit 190, and the rear surface portion 191 may contact the first and second image stabilization driving units 210 and 220 or may be arranged apart from the first and second image stabilization driving units 210 and 220.

The image stabilization module 200 may include the first image stabilization driving unit 210 for correcting a hand tremble in the first direction X, the second image stabilization driving unit 220 for correcting a hand tremble in the second direction Y, the first-first sensor unit 231 and the first-second sensor unit 232 for detecting a degree and a direction of the hand tremble, and the second-first sensor unit 241 and the second-second sensor unit 242 for measuring a displacement of shifts of the lens module 110 in the first direction X and the second direction Y.

The first image stabilization driving unit 210 is a driving unit configured to transmit a driving force in the first direction X to the lens module 110 by contacting the contact unit 114 included in the first lens barrel unit 111 in order to correct a hand tremble in the first direction X. Also, the second image stabilization driving unit 220 is a driving unit configured to transmit a driving force in the second direction Y to the lens module 110 by contacting the contact unit 114 included in the first lens barrel unit 111 in order to correct a hand tremble in the second direction X. For example, the first and second image stabilization driving units 210 and 220 may include the plurality of fourth piezoelectric devices 2400 arranged apart from one another as a lattice shape. Here, the fourth piezoelectric devices 2400 may contract or extend in the optical axis direction Z of incident light and may be arranged on the second surface 172-2 of the sensor circuit substrate 172 to face the rear surface portion 191 of the support unit 190.

Figure 17A:
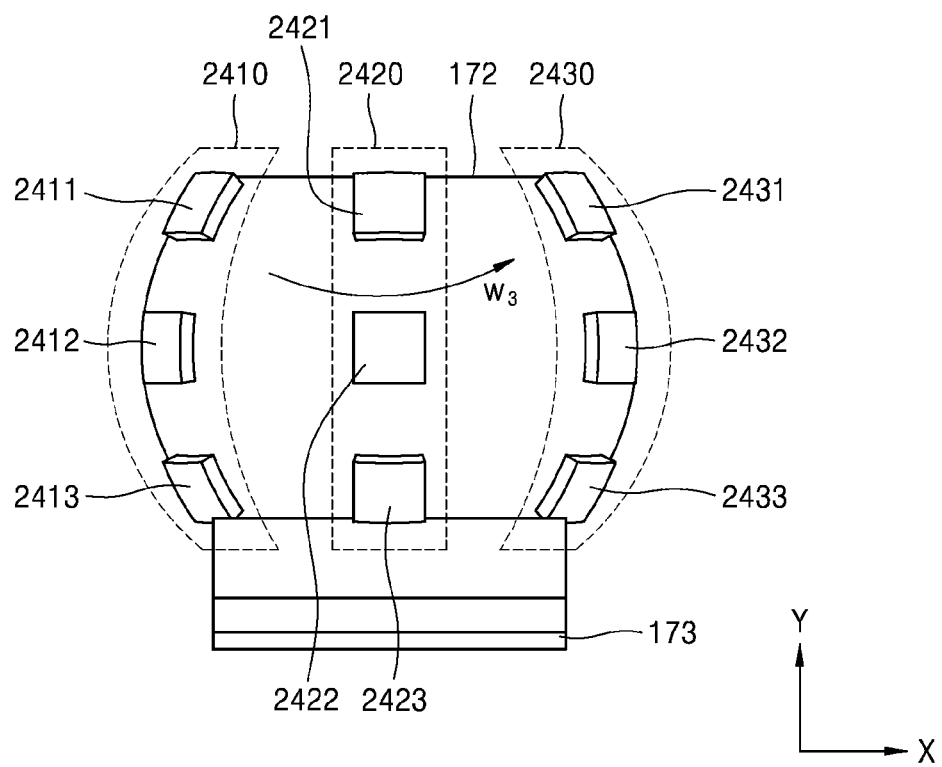
FIG. 17A is a rear view of an image stabilization driving unit and an image sensor module.
Figure 17B:
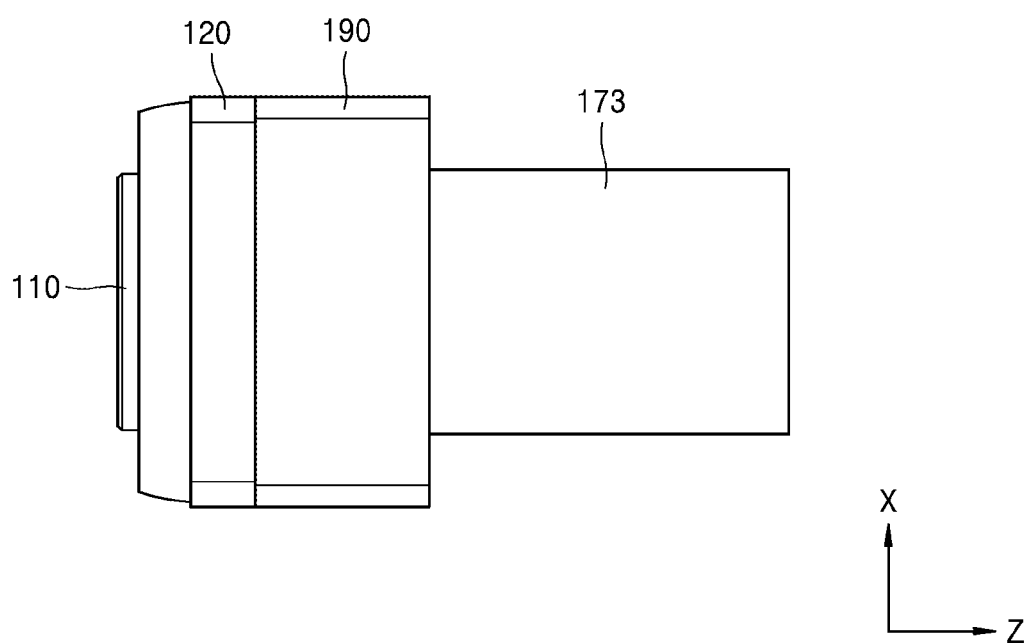
FIGS. 17B and 17C are sectional side views of a photographing apparatus module.
Figure 17C:
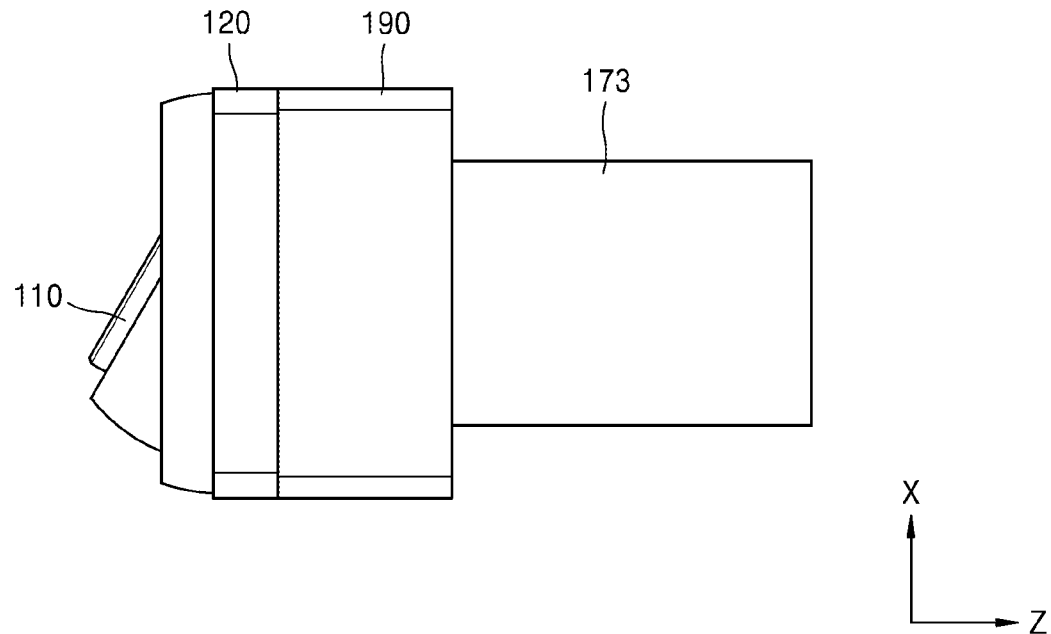
Figure 18A:
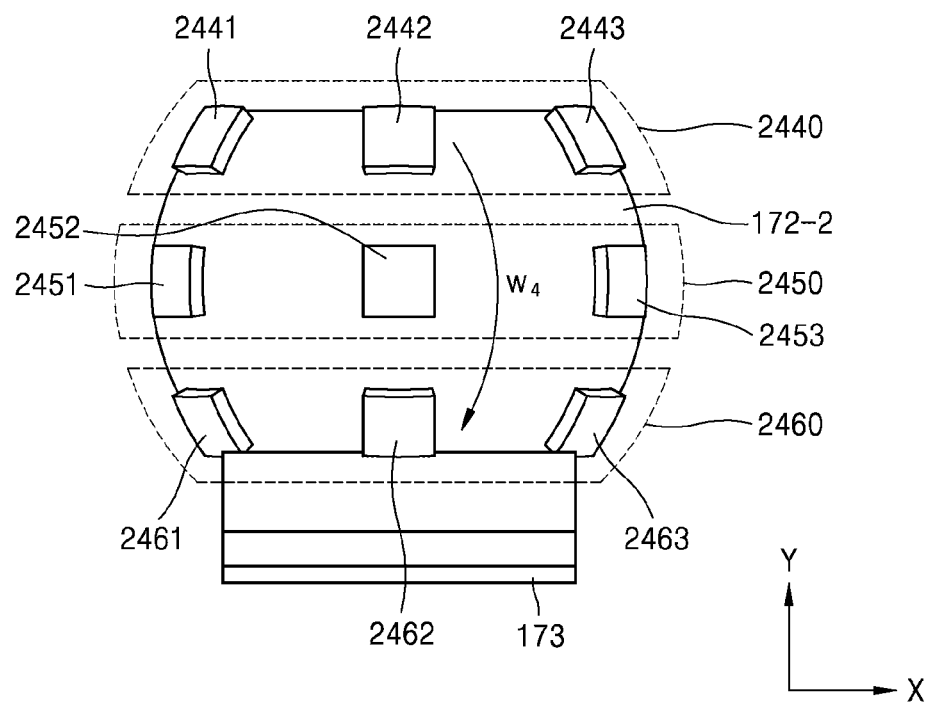
FIG. 18A is a rear view of an image stabilization driving unit and an image sensor module.
Figure 18B:
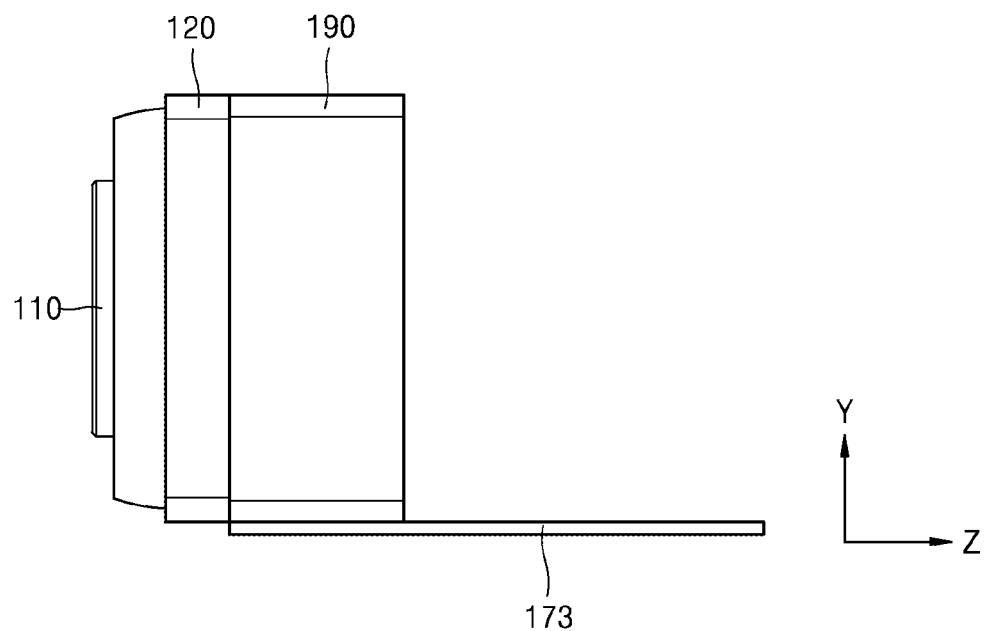
FIGS. 18B and 18C are sectional side views of a photographing apparatus module.
Figure 18C:
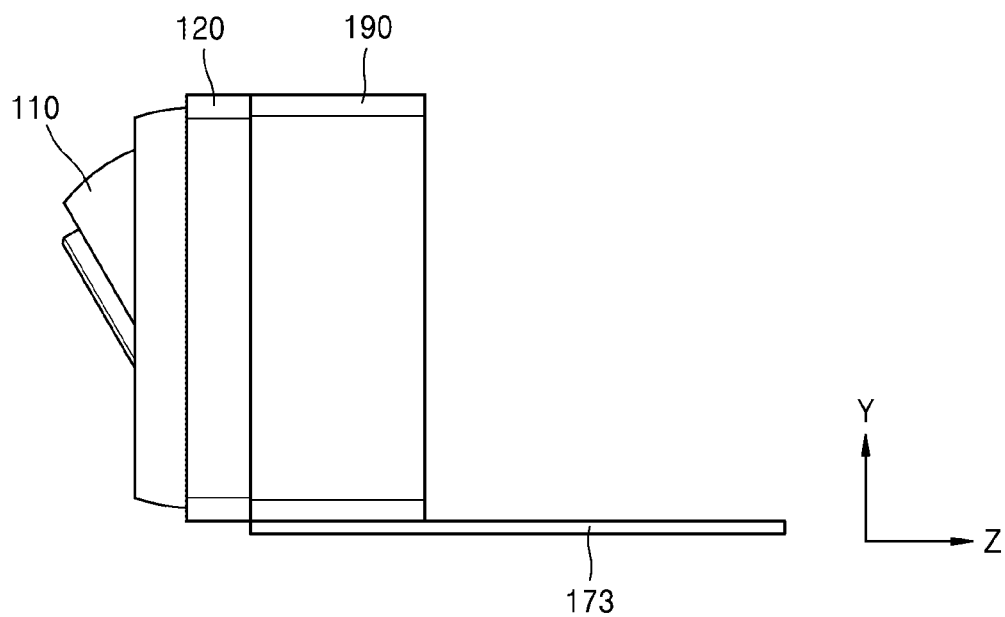

FIG. 17A is a rear view of the image stabilization driving units 210 and 220 and the image sensor module 170 according to another embodiment. FIGS. 17B and 17C are sectional side views of the photographing apparatus module 10 according to another embodiment. FIG. 18A is a rear view of the image stabilization driving units 210 and 220 and the image sensor module 170 according to another embodiment. FIGS. 18B and 18C are sectional side views of the photographing apparatus module 10 according to another embodiment.

Referring to FIGS. 2, 17A and 17B, the first and second image stabilization driving units 210 and 220 may include the plurality of fourth piezoelectric devices 2400 arranged to be apart from one another as a lattice structure. A fourth-first piezoelectric device unit 2410 may include fourth-eleventh through fourth-thirteenth piezoelectric devices 2411 through 2413 arranged apart from one another in a circumferential direction based on the first direction X, a fourth-second piezoelectric device unit 2420 may include fourth-twenty first through fourth-twenty third piezoelectric devices 2421 through 2423 arranged apart from one another in the circumferential direction based on the first direction X, and a fourth-third piezoelectric device unit 2430 may include fourth-thirty first through fourth-thirty third piezoelectric devices 2431 through 2433 arranged apart from one another in the circumferential direction based on the first direction X.

A voltage having a certain phase difference may be applied to each of the fourth-first through fourth-third piezoelectric device units 2410 through 2430 arranged apart from one another in a circumferential direction based on the second direction Y, and thus, a driving force in the circumferential direction based on the second direction Y may be generated. For example, when the voltage having a certain phase difference is applied to each of the fourth-first through fourth-third piezoelectric device units 2410 through 2430, first, the fourth-eleventh through fourth-thirteenth piezoelectric devices 2411 through 2413 may extend. Then, the fourth-twenty first through fourth-twenty third piezoelectric devices 2421 through 2423 may extend while the fourth-eleventh through fourth-thirteenth piezoelectric device 2411 through 2413 contract. Thereafter, the fourth-thirty first through fourth-thirty third piezoelectric devices 2431 through 2433 may extend while the fourth-twenty first through fourth twenty third piezoelectric devices 2421 through 2423 contract. As the fourth-first through fourth-third piezoelectric device units 2410 through 2430 extend and contract, the sensor circuit substrate 172 including a flexible material may also be changed.

As the fourth-first through fourth-third piezoelectric devices 2410 through 2430 sequentially extend and contract, a traveling wave $W_3$ in the circumferential direction based on the second direction Y may be generated. Here, a portion of the sensor signal substrate 172 may contact the contact unit 114 since the sensor signal substrate 172 is changed due to the traveling wave $W_3$, and thus, the contact unit 114 may transmit a driving force in the circumferential direction based on the second direction Y due to the traveling wave $W_3$ to the lens module 110. The lens module 110 may be tilted based on the second direction Y by the driving force transmitted by the sensor circuit substrate 172. Here, the second-first sensor unit 241 may sense an amount of rotation of the lens module 110 based on the second direction Y so that a relative position of the lens module 110 and the image sensor 171 with respect to the first direction X may be corrected.

Referring to FIGS. 2, 18A and 18B, a fourth-fourth piezoelectric device unit 2440 may include fourth-forty first through fourth-forty third piezoelectric devices 2441 through 2443 arranged apart from one another in the circumferential direction based on the second direction Y, a fourth-fifth piezoelectric device unit 2450 may include fourth-fifty first through fourth-fifty third piezoelectric devices 2451 through 2453 arranged apart from one another in the circumferential direction based on the second direction Y, and a fourth-sixth piezoelectric device unit 2460 may include fourth-sixty first through fourth-sixty third piezoelectric devices 2461 through 2463 arranged apart from one another in the circumferential direction based on the second direction Y.

Tilting the lens module 110 based on the second direction Y by using contraction and extension of the fourth-fourth through fourth-sixth piezoelectric device units 2440 through 2460 is substantially the same as tilting the lens module 110 based on the first direction X by using the contraction and extension of the fourth-first through fourth-third piezoelectric device units 2410 through 2430, and thus, detailed descriptions thereof will be omitted for convenience of explanation.

As described above, according to the one or more of the above example embodiments, the photographing apparatus module including an image stabilization function while having a reduced and/or minimized size and weight and having a simple structure, and the user terminal device including the photographing apparatus module may be provided.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A photographing apparatus module comprising:
an image sensor module comprising an image sensor;
a lens module including a lens, wherein the lens module is shifted with respect to the image sensor module in a first direction or a second direction perpendicular to an optical axis direction of incident light;
an image stabilization module including image stabilization circuitry arranged in the image sensor module configured to apply a driving force to the lens module;
a first sensor configured to detect a displacement of a shift of the photographing apparatus module in the first direction;
a second sensor configured to detect a displacement of a shift of the photographing apparatus module in the second direction;
a third sensor configured to detect a displacement of the shift of the lens module in the first direction;
a fourth sensor configured to detect a displacement of the shift of the lens module in the second direction; and
a controller configured to compare the displacements of the shifts of the photographing apparatus module, which are received from the first and second sensors, to the displacements of the shifts of the lens module, which are received from the third and fourth sensors, and to apply a driving signal to the image stabilization module.

2. The photographing apparatus module of claim 1, wherein the image sensor module comprises a sensor circuit substrate facing the lens module and the image sensor on a surface of the sensor circuit substrate, and
the image stabilization module comprises:
- a first image stabilization driving unit on a surface of the sensor circuit substrate facing the lens module, the first image stabilization driving unit being configured to apply a driving force to the lens module in the first direction; and
- a second image stabilization driving unit on a surface of the sensor circuit substrate facing the lens module, the second image stabilization driving unit being configured to apply a driving force to the lens module in the second direction.

3. The photographing apparatus module of claim 2, wherein the sensor circuit substrate comprises a rigid substrate.

4. The photographing apparatus module of claim 3, wherein the first image stabilization driving unit comprises a plurality of first piezoelectric devices which are spaced apart from one another in the first direction, and
the second image stabilization driving unit comprises a plurality of second piezoelectric devices which are spaced apart from one another in the second direction.

5. The photographing apparatus module of claim 4, wherein the plurality of first piezoelectric devices and the plurality of second piezoelectric devices are disposed around the image sensor.

6. The photographing apparatus module of claim 4, wherein the lens module comprises a contact unit facing the plurality of first piezoelectric devices and the plurality of second piezoelectric devices.

7. The photographing apparatus module of claim 2, further comprising:
- a first case configured to accommodate the lens module; and
- a second case configured to accommodate the first case,
wherein the lens module is shifted with respect to the first case in the first direction, and the first case is shifted with respect to the second case in the second direction.

8. A photographing apparatus module, comprising:
an image sensor module comprising an image sensor;
a lens module including a lens, wherein the lens module is shifted with respect to the image sensor module in a first direction or a second direction perpendicular to an optical axis direction of incident light; and
an image stabilization module including image stabilization circuitry arranged in the image sensor module configured to apply a driving force to the lens module,
wherein the image sensor module comprises a sensor circuit substrate facing the lens module and the image sensor on a surface of the sensor circuit substrate, and
the image stabilization module comprises:
- a first image stabilization driving unit on a second surface of the sensor circuit substrate, which faces a first surface of the sensor circuit substrate facing the lens module, the first image stabilization driving unit being configured to apply a driving force to the lens module in the first direction; and
- a second image stabilization driving unit on the second surface of the sensor circuit substrate, the second image stabilization driving unit being configured to apply a driving force to the lens module in the second direction.

9. The photographing apparatus module of claim 8, further comprising:
- a first case configured to accommodate the lens module; and
- a second case configured to accommodate the first case,
wherein the lens module is shifted with respect to the first case in the first direction, and the first case is shifted with respect to the second case in the second direction.

10. The photographing apparatus module of claim 9, wherein the sensor circuit substrate comprises a flexible substrate.

11. The photographing apparatus module of claim 10, further comprising a support substrate facing the second surface of the sensor circuit substrate,
wherein the first image stabilization driving unit comprises a plurality of first piezoelectric devices which are spaced apart from one another in the first direction, and
the second image stabilization driving unit comprises a plurality of second piezoelectric devices which are spaced apart from one another in the second direction.

12. The photographing apparatus module of claim 11, wherein the plurality of first and second piezoelectric devices are arranged on the second surface of the sensor circuit substrate in a substantially lattice shaped configuration.

13. The photographing apparatus module of claim 12, wherein the lens module comprises a contact unit facing the first surface of the sensor circuit substrate.

14. The photographing apparatus module of claim 8, further comprising a first case configured to accommodate the lens module,
wherein the lens module is tilted with respect to the first case, based on the first direction, and is tilted with respect to the first case, based on the second direction.

15. The photographing apparatus module of claim 14, wherein a rear surface portion of the lens module has a semi-spherical shape, and
the sensor circuit substrate comprises a flexible substrate and has a semi-spherical shape corresponding to the shape of the rear surface portion of the lens module.

16. The photographing apparatus module of claim 15, further comprising a support unit facing the second surface of the sensor circuit substrate,
wherein the first image stabilization driving unit and the second image stabilization unit comprise a plurality of piezoelectric devices arranged on the second surface of the sensor circuit substrate in a substantially lattice shaped configuration.

17. The photographing apparatus module of claim 16, wherein the lens module comprises a contact unit facing the first surface of the sensor circuit substrate.

* * * * *